(12) United States Patent
Fortin-Deschênes et al.

(10) Patent No.: US 10,761,321 B2
(45) Date of Patent: Sep. 1, 2020

(54) OPTICAL ARRANGEMENTS INCLUDING FRESNEL LENS ELEMENTS

(71) Applicant: Apple Inc., Cupertino, CA (US)

(72) Inventors: Simon Fortin-Deschênes, Sunnyvale, CA (US); Ian Powell, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 66 days.

(21) Appl. No.: 16/063,577

(22) PCT Filed: Mar. 21, 2017

(86) PCT No.: PCT/CA2017/000061
§ 371 (c)(1),
(2) Date: Oct. 10, 2018

(87) PCT Pub. No.: WO2017/161437
PCT Pub. Date: Sep. 28, 2017

(65) Prior Publication Data
US 2019/0227305 A1 Jul. 25, 2019

Related U.S. Application Data

(60) Provisional application No. 62/311,141, filed on Mar. 21, 2016.

(51) Int. Cl.
*G02B 27/00* (2006.01)
*G02B 3/08* (2006.01)
(Continued)

(52) U.S. Cl.
CPC .......... *G02B 27/0081* (2013.01); *G02B 3/04* (2013.01); *G02B 3/08* (2013.01); *G02B 25/001* (2013.01);
(Continued)

(58) Field of Classification Search
CPC ........ G02B 27/0081; G02B 3/04; G02B 3/08; G02B 25/001; G02B 25/008;
(Continued)

(56) References Cited

U.S. PATENT DOCUMENTS 5,999,147 A 12/1999 Teitel
2004/0085517 A1 5/2004 Togino et al.
(Continued)

FOREIGN PATENT DOCUMENTS

EP 0949826 A2 10/1999
JP 3430615 B2 7/2003

OTHER PUBLICATIONS

International Search Report for PCT/CA2017/000061 dated Jun. 23, 2017.
(Continued)

*Primary Examiner* — Wen Huang
(74) *Attorney, Agent, or Firm* — Fernando & Partners, LLP

(57) ABSTRACT

An optical lens arrangement comprises a first Fresnel lens element and a second lens element, The first Fresnel lens element defines a flat surface side and an opposite faceted surface side defining wedge and draft faces. The flat surface side faces towards the eye of a user and the opposite faceted surface side faces away from the eye of the user. The second lens element interfaces with the faceted surface side of first Fresnel lens. The second lens element is selected from the group consisting of: a second Fresnel lens element, a singlet lens element, a doublet lens element and any combination thereof. The first Fresnel lens is proximal relative to the eye of the user and the second lens element is distal relative to the eye of the user. Head mounted devices (HMD) including
(Continued)

these optical lens arrangements are provided. Methods of making such optical lens arrangements and HMDs are also provided.

20 Claims, 28 Drawing Sheets

(51) Int. Cl.
  *G02B 27/01* (2006.01)
  *G02B 25/00* (2006.01)
  *G02B 3/04* (2006.01)
  *G02B 27/42* (2006.01)

(52) U.S. Cl.
  CPC ....... *G02B 25/008* (2013.01); *G02B 27/0172* (2013.01); *G02B 27/0018* (2013.01); *G02B 27/4211* (2013.01); *G02B 2027/0116* (2013.01); *G02B 2027/0118* (2013.01)

(58) Field of Classification Search
  CPC ............ G02B 27/0172; G02B 27/0018; G02B 27/4211; G02B 2027/0116; G02B 2027/0118
  See application file for complete search history.

(56) References Cited

U.S. PATENT DOCUMENTS

2016/0011341 A1   1/2016   Smith
2016/0070103 A1   3/2016   Yoon

OTHER PUBLICATIONS

International Preliminary Report on Patentability for PCT/CA2017/000061 dated Sep. 25, 2018.
Extended European Search Report for EP17769200.1 dated Jun. 5, 2019.

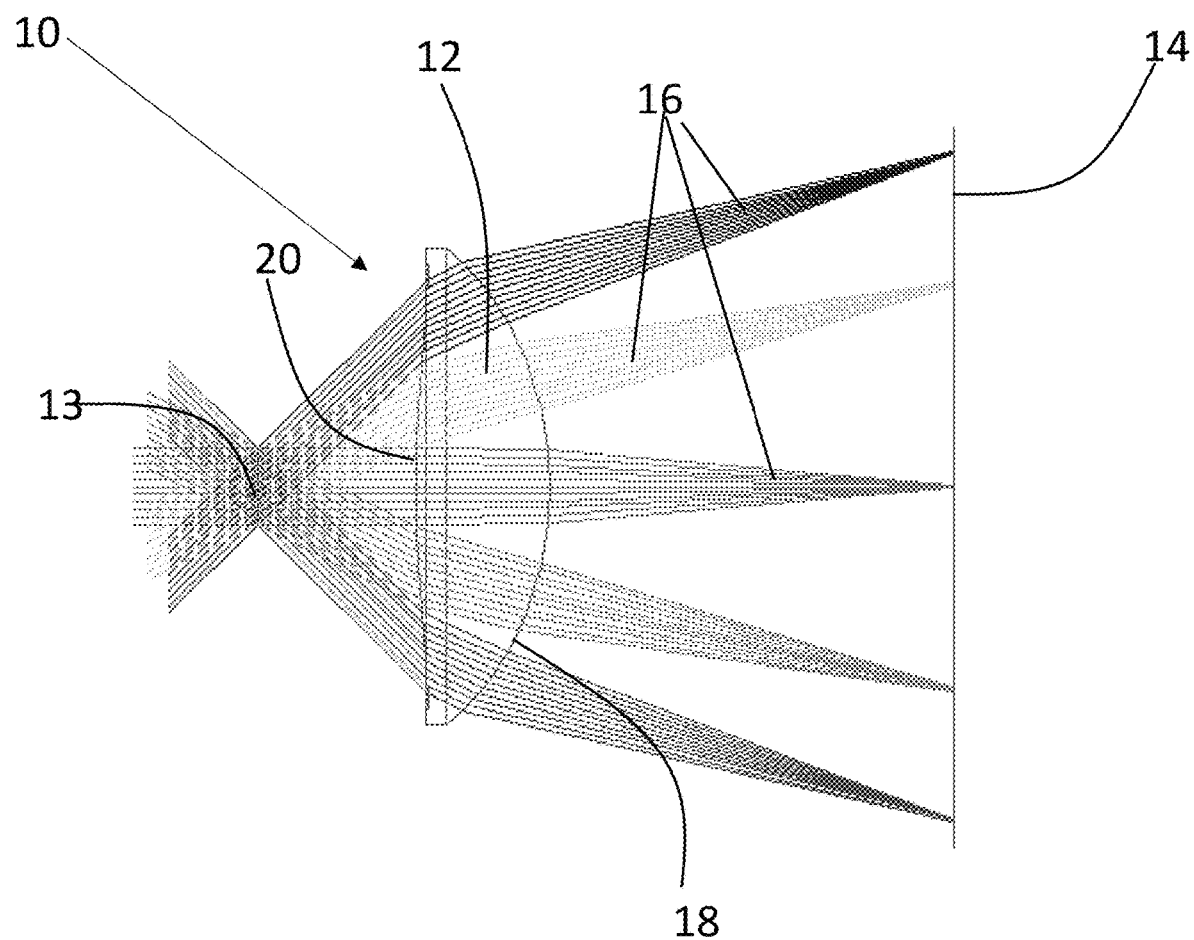
FIG. 1A: OCULAR ASPHERICAL SINGLET LENS

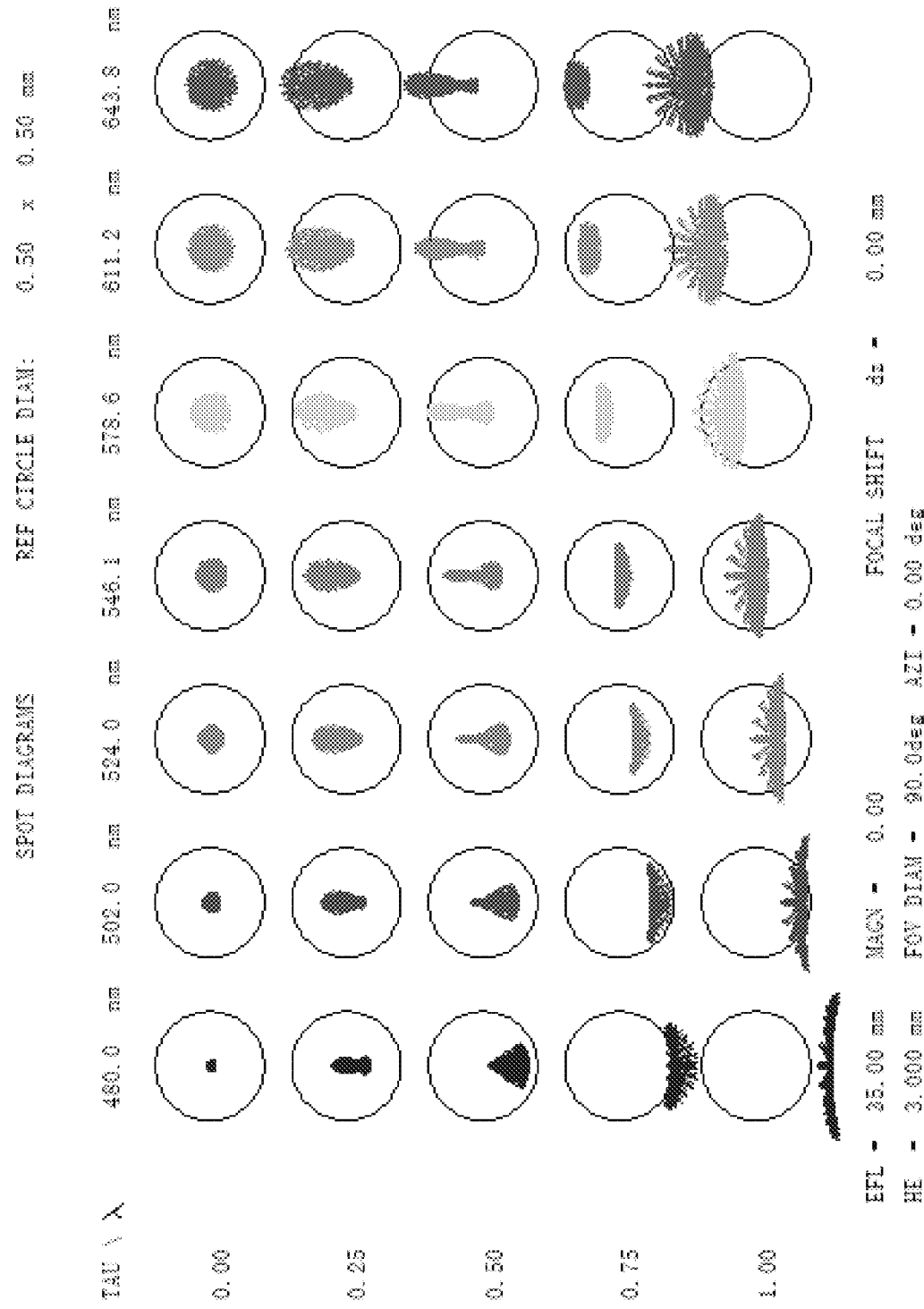
FIG. 1B: SPOT DIAGRAMS ASSOCIATED WITH THE OCULAR ASPHERICAL LENS IN FIG.1A

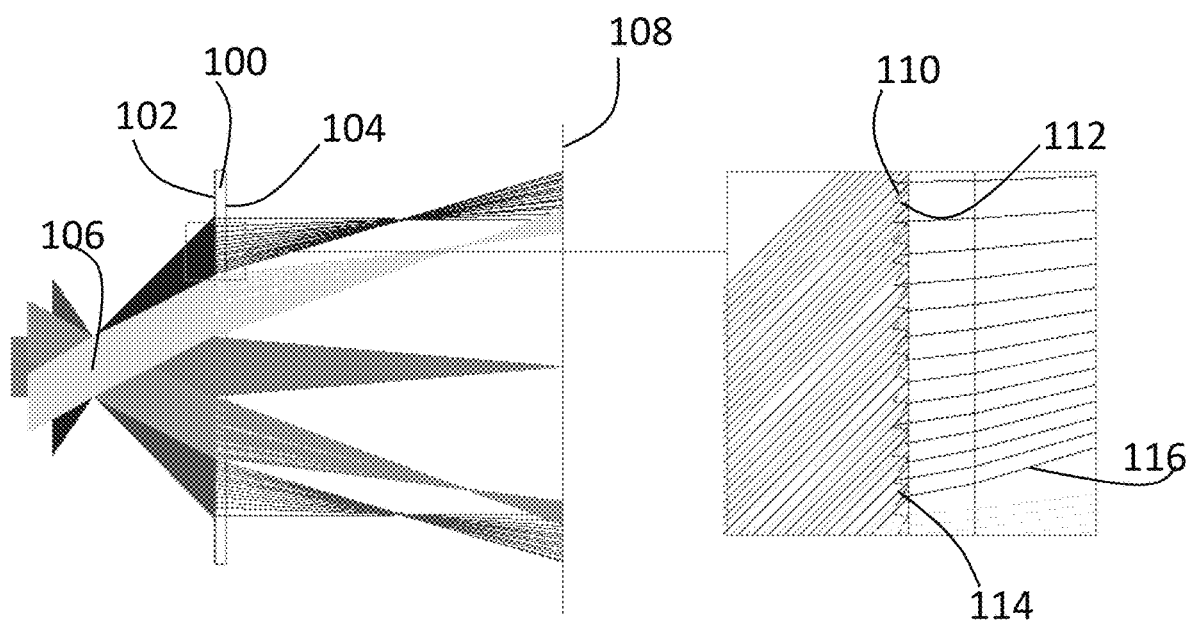
FIG. 2A: FRESNEL LENS WITH FACETED SURFACE TOWARDS THE EYE

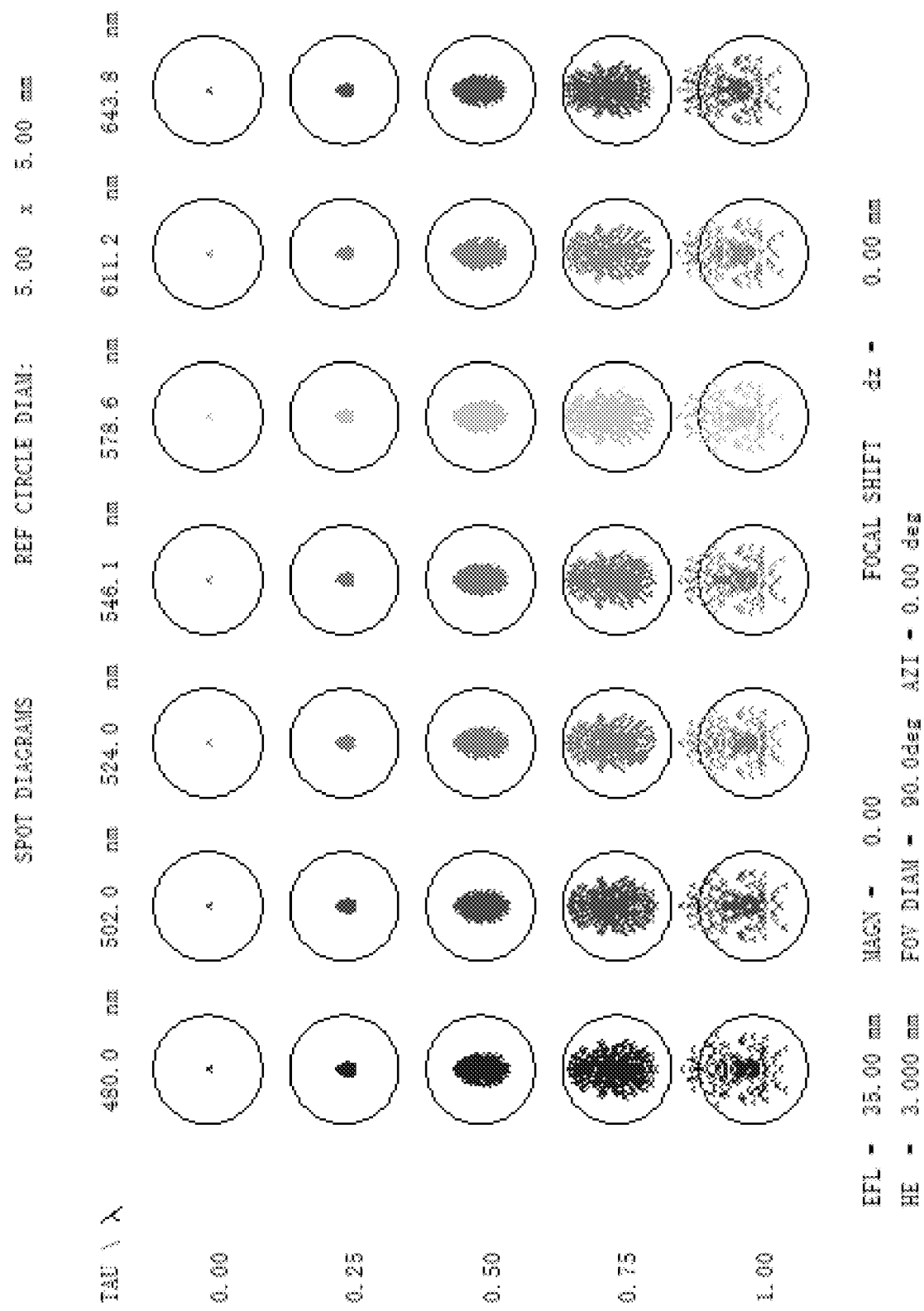
FIG. 2B: SPOT DIAGRAMS ASSOCIATED WITH LENS OF FIG. 2A

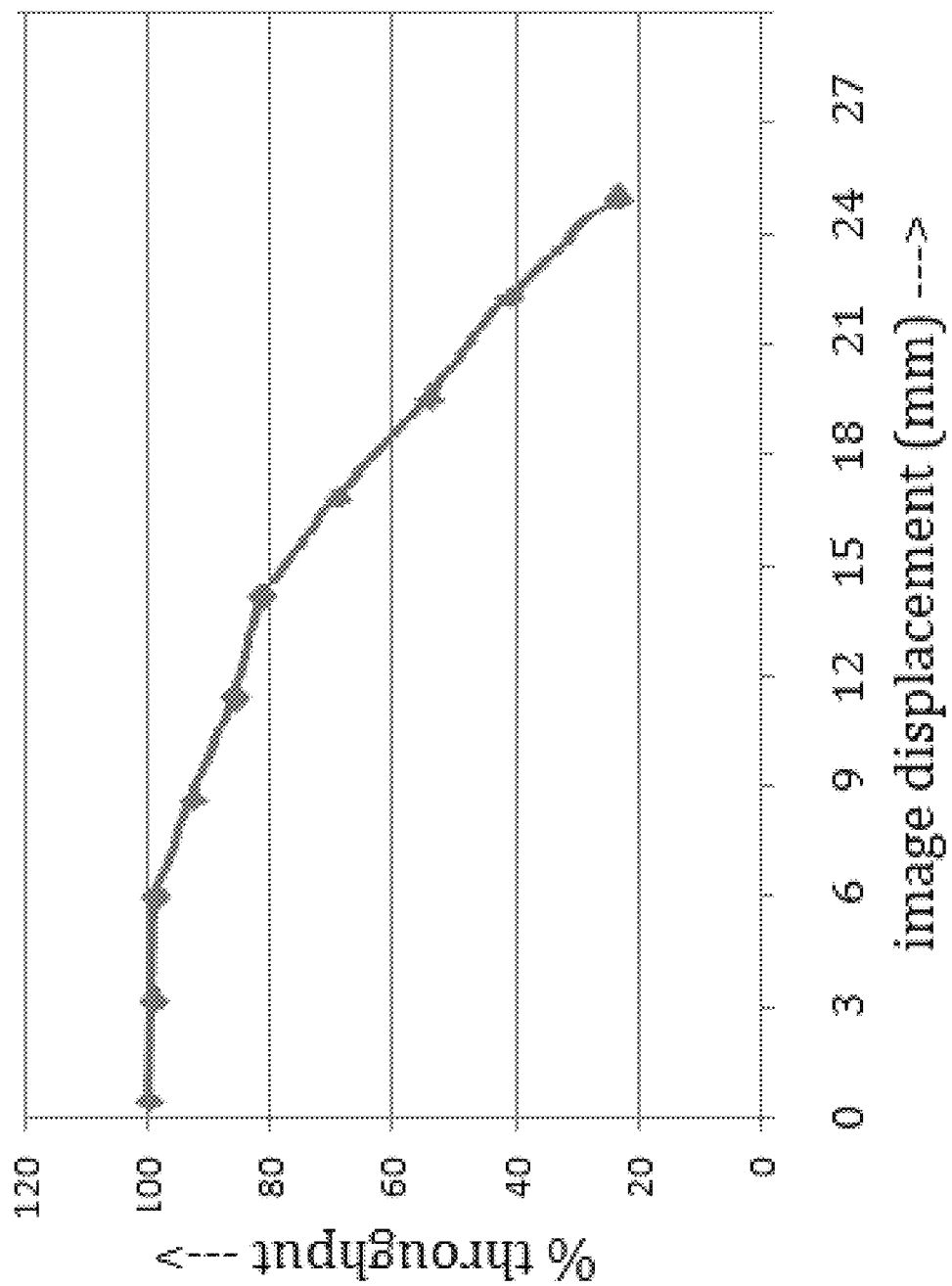
FIG. 2C: DROP OFF IN ILLUMINATION ACROSS FOV FOR THE FRESNEL LENS IN FIG. 2A

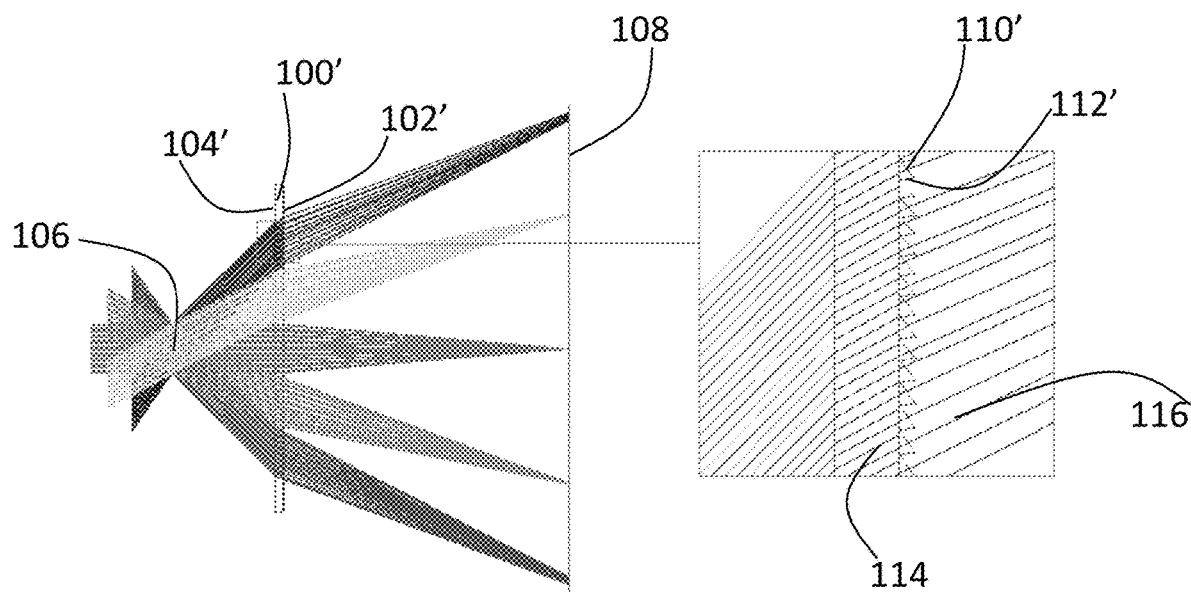
FIG. 3A: FRESNEL LENS WITH FACETED SURFACE AWAY FROM EYE

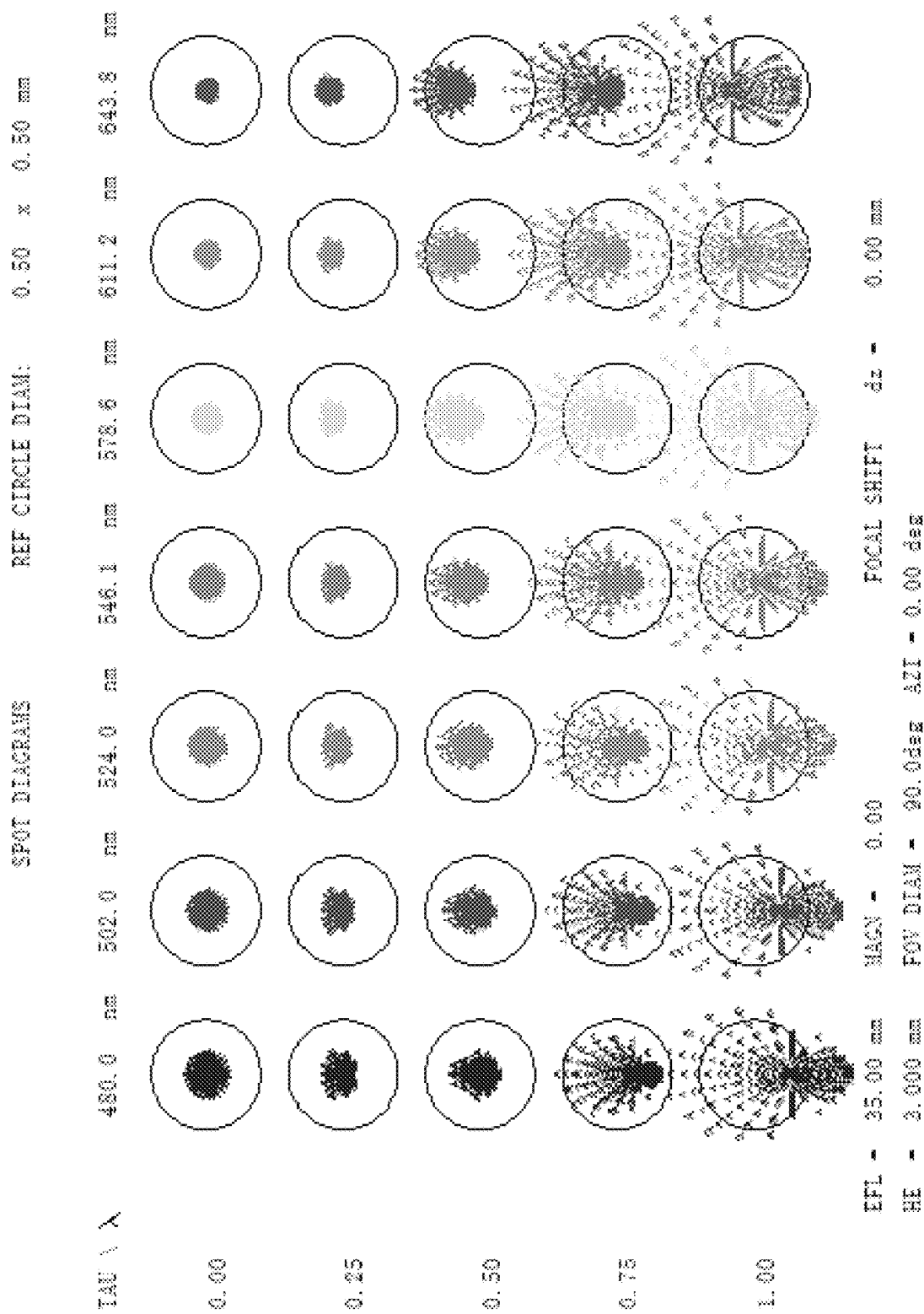
FIG. 3B: SPOT DIAGRAMS ASSOCIATED WITH FRESNEL LENS OF FIGURE 3A

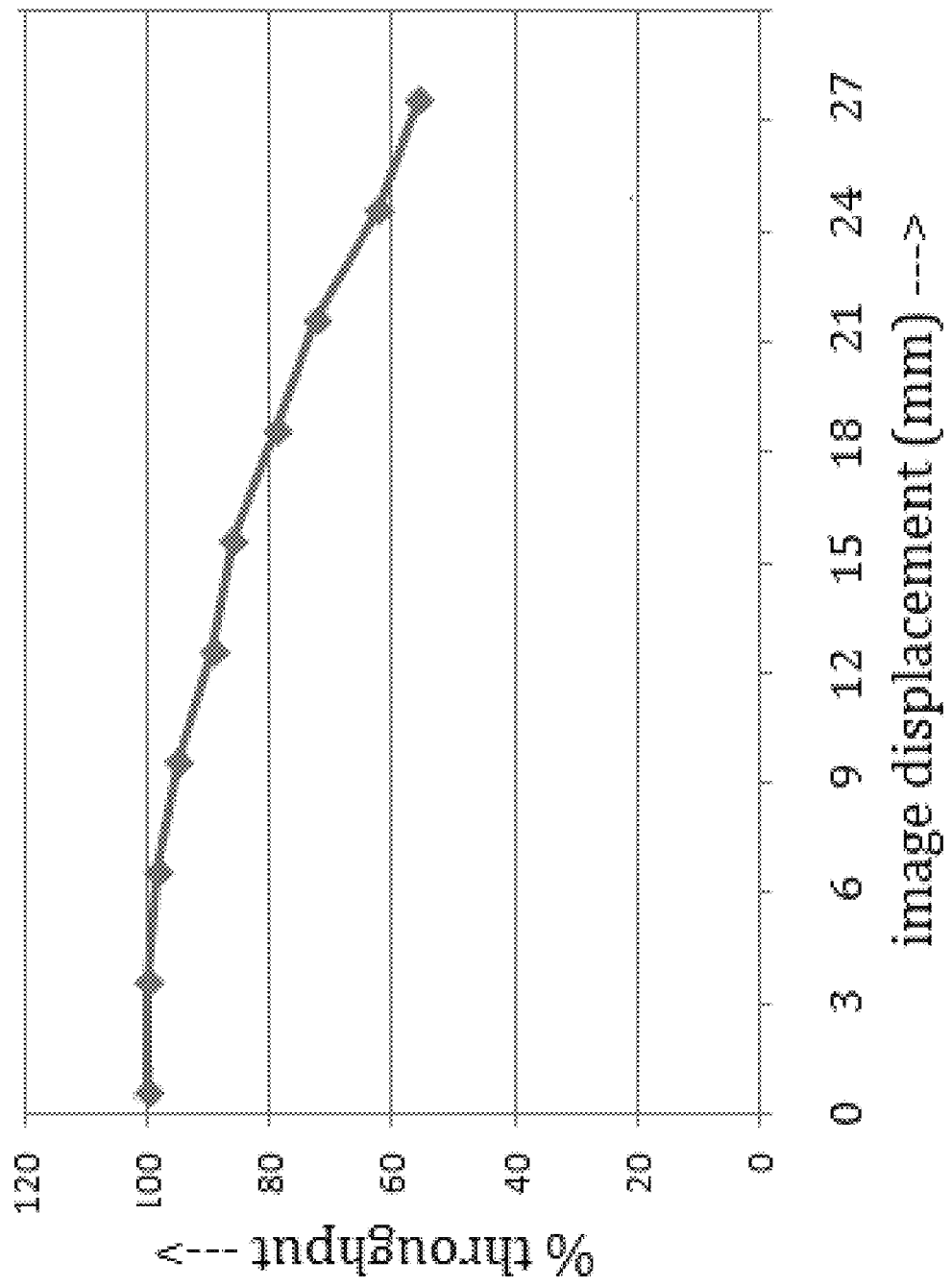
FIG. 3C: DROP OFF IN ILLUMINATION ACROSS FOV FOR THE FESNEL LENS OF FIG. 3A

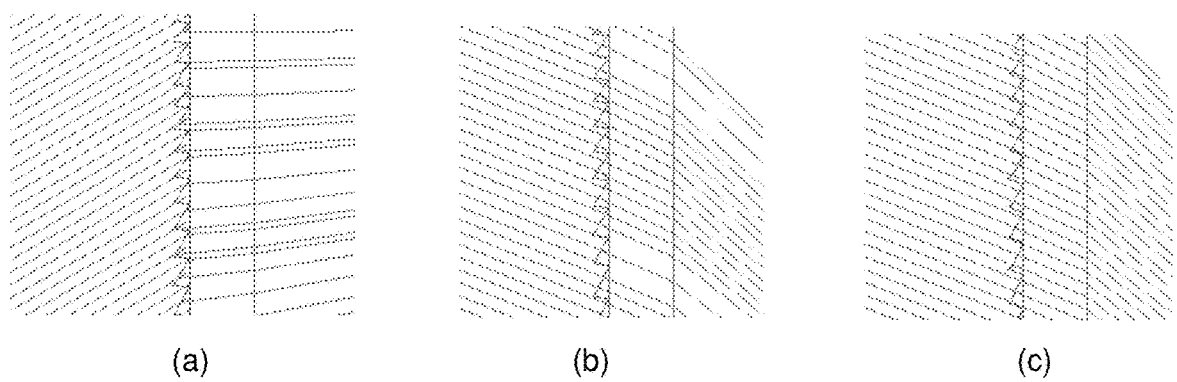
FIG. 4: RAY TRAJECTORY FROM LEFT TO RIGHT THROUGH VARIOUS FRESNEL LENS SURFACES

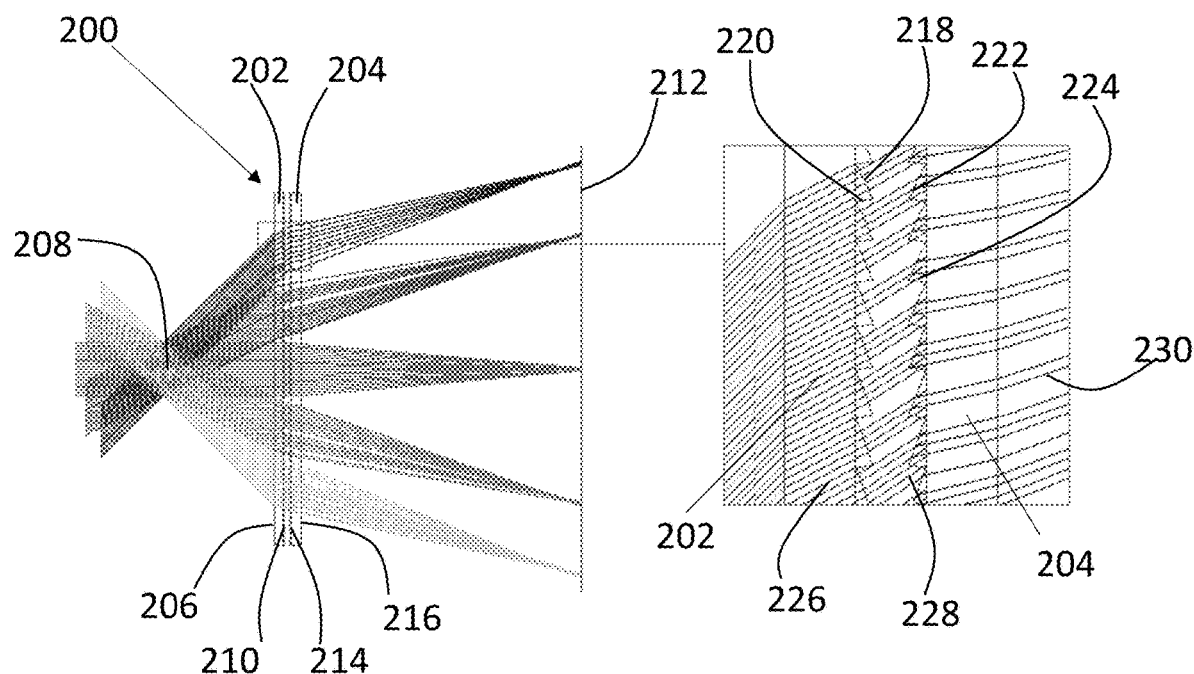
FIG. 5A: PAIR OF FRESNEL LENSES WITH FACETED SURFACES TOWARDS EACH OTHER

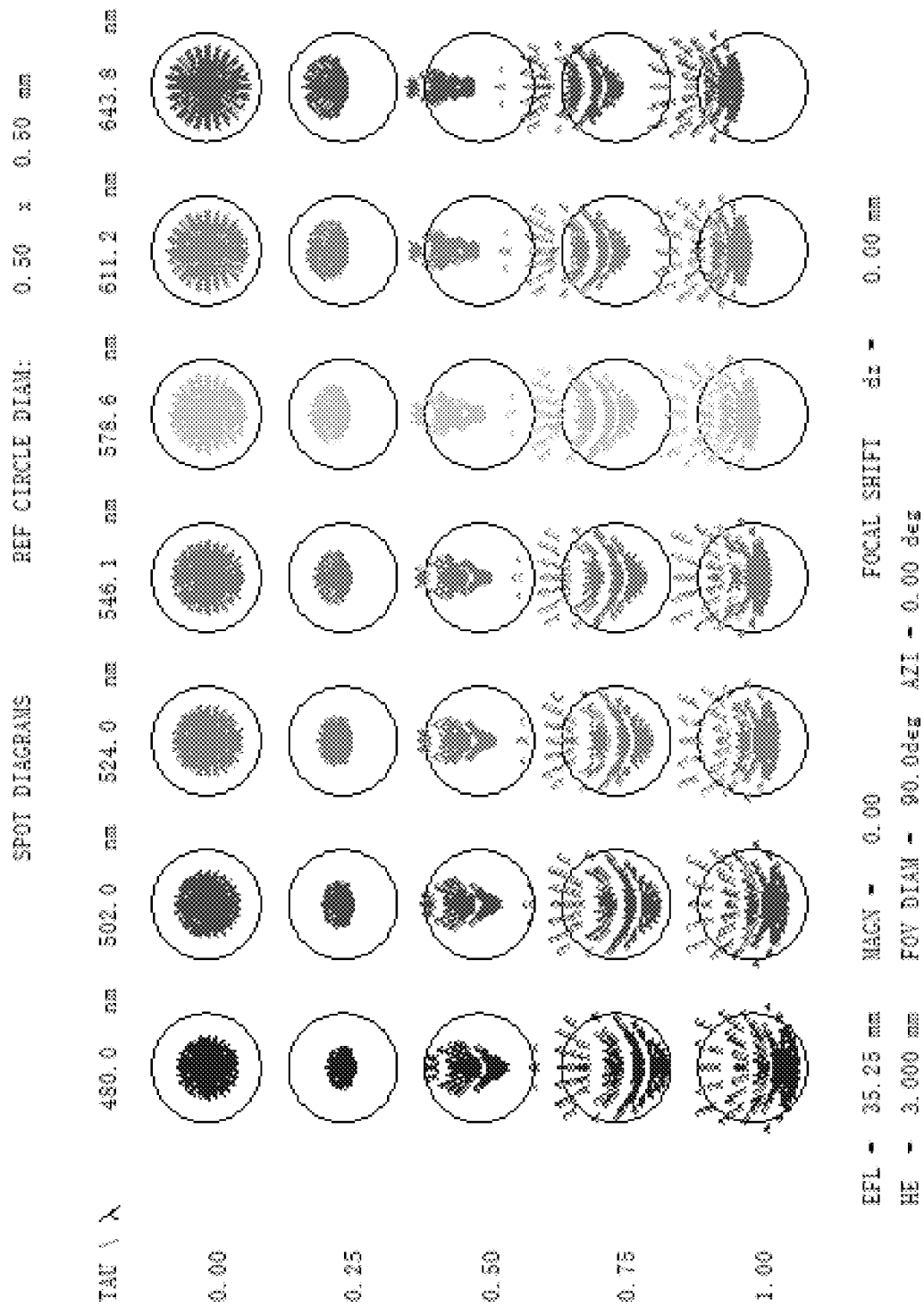
FIG. 5B: SPOT DIAGRAMS ASSOCIATED WITH LENS ARRANGEMENT OF FIG. 5A

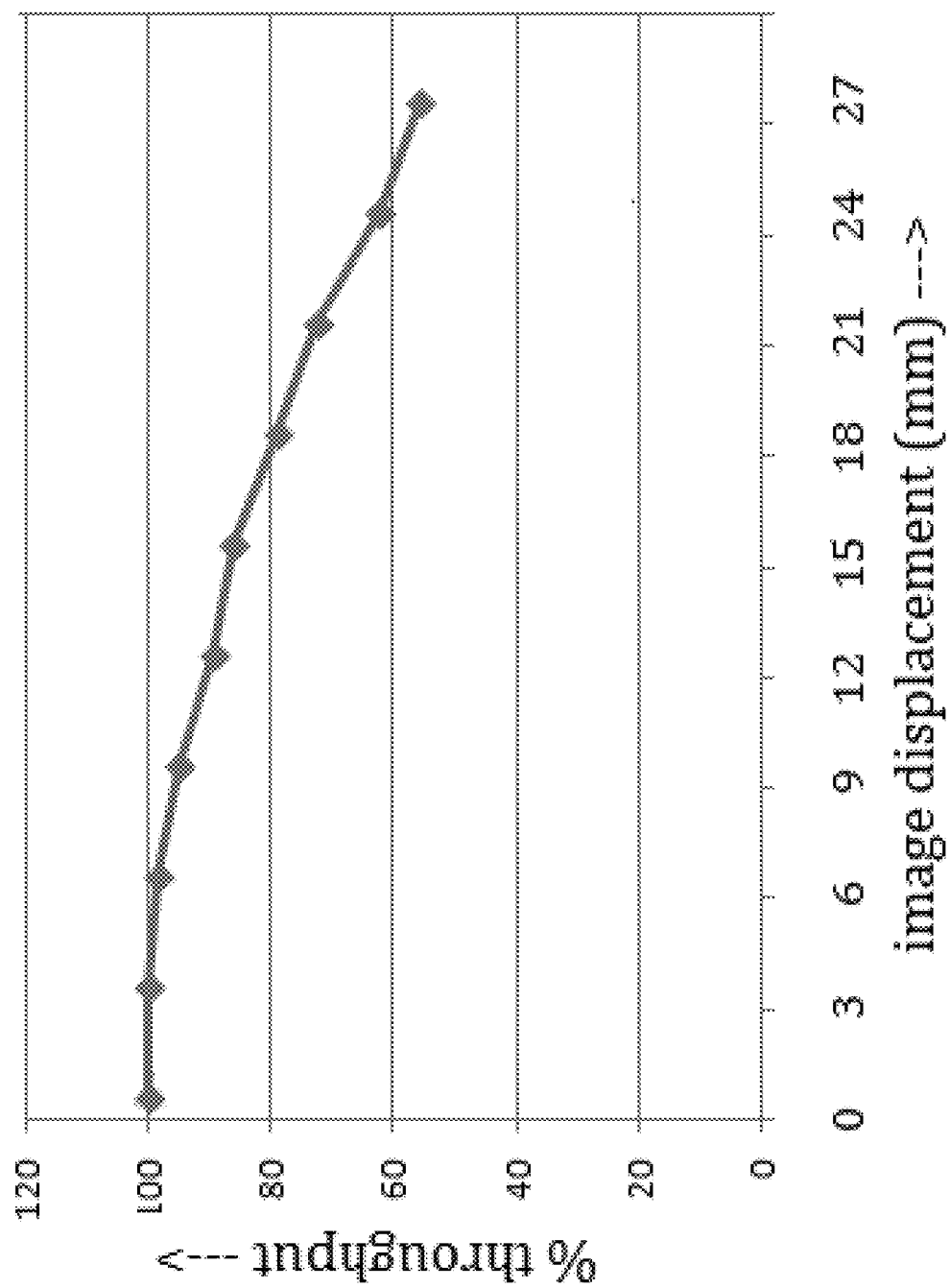
FIG. 5C: DROP OFF IN ILLUMINATION ACROSS FOV FOR LENS ARRANGEMENT OF FIG. 5A

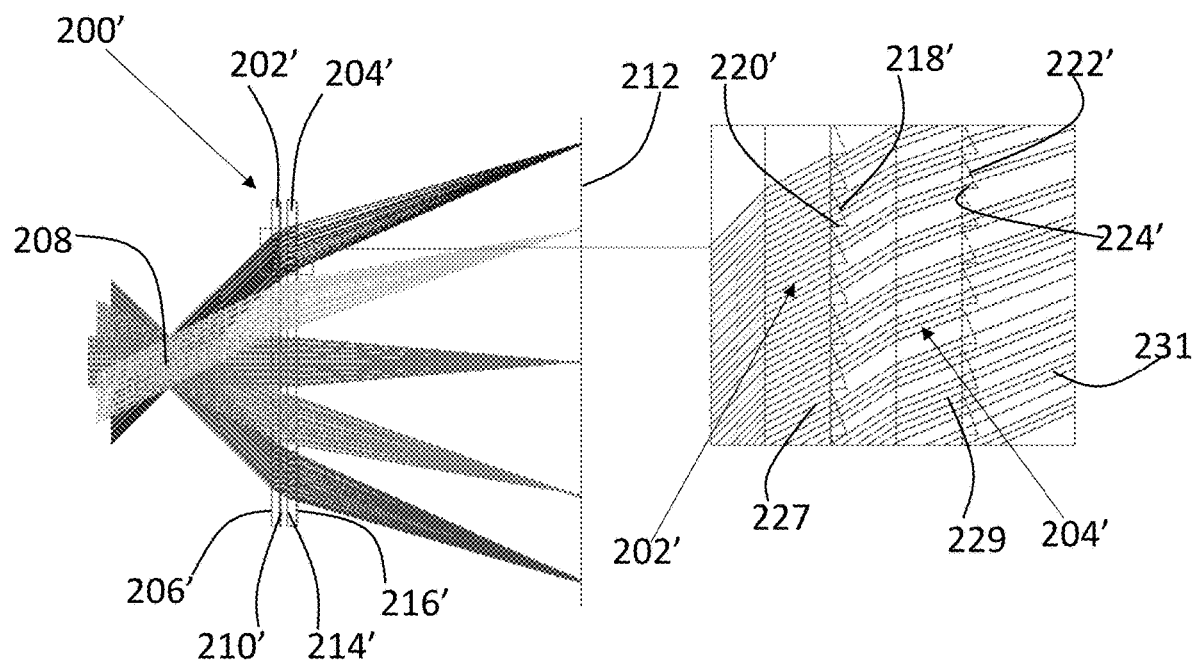
FIG. 6A: PAIR OF FRESNEL LENSES WITH FACETED SURFACES AWAY FROM EYE

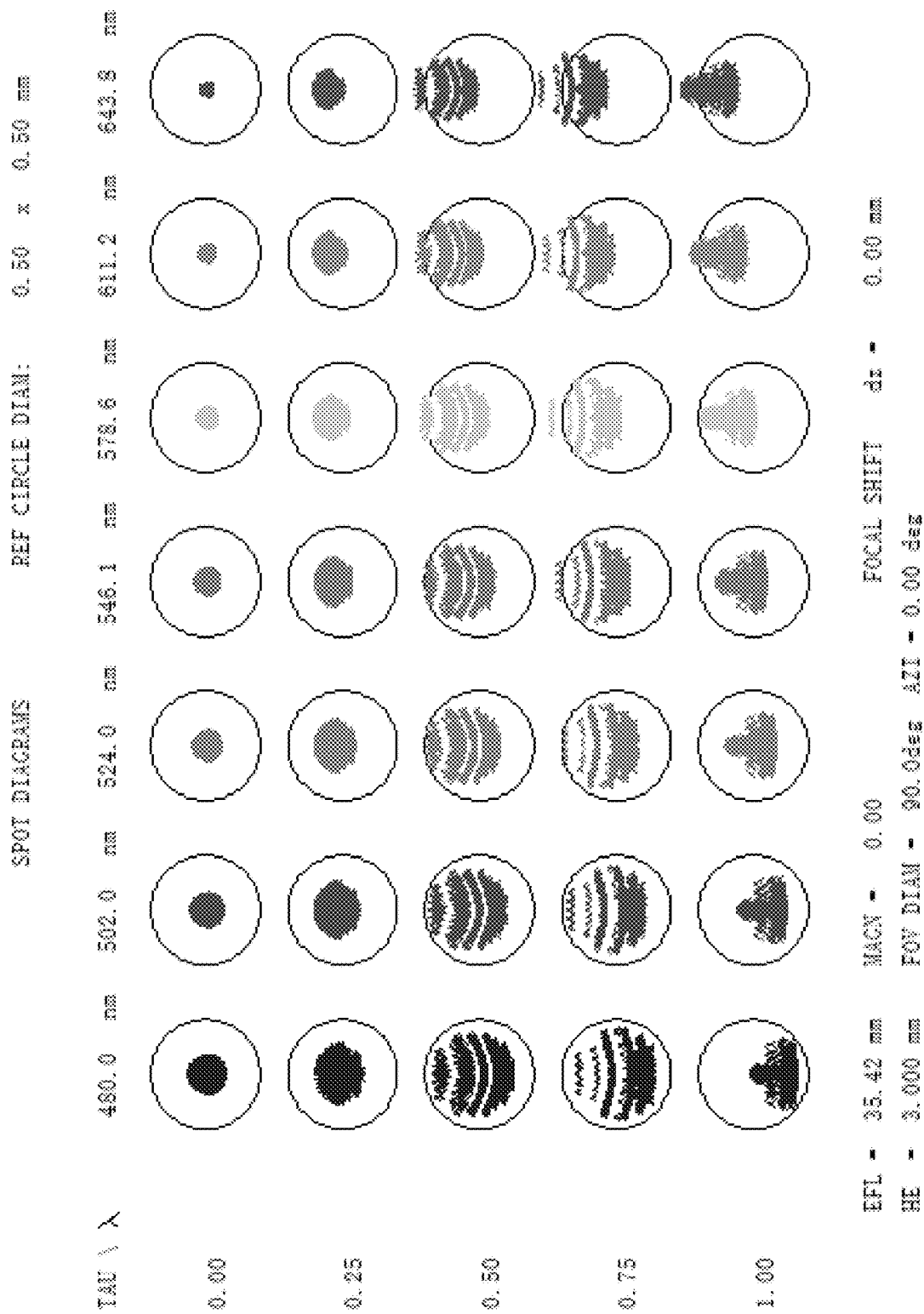
FIG. 6B: SPOT DIAGRAMS ASSOCIATED WITH THE LENS ARRANGEMENT OF FIG. 6A

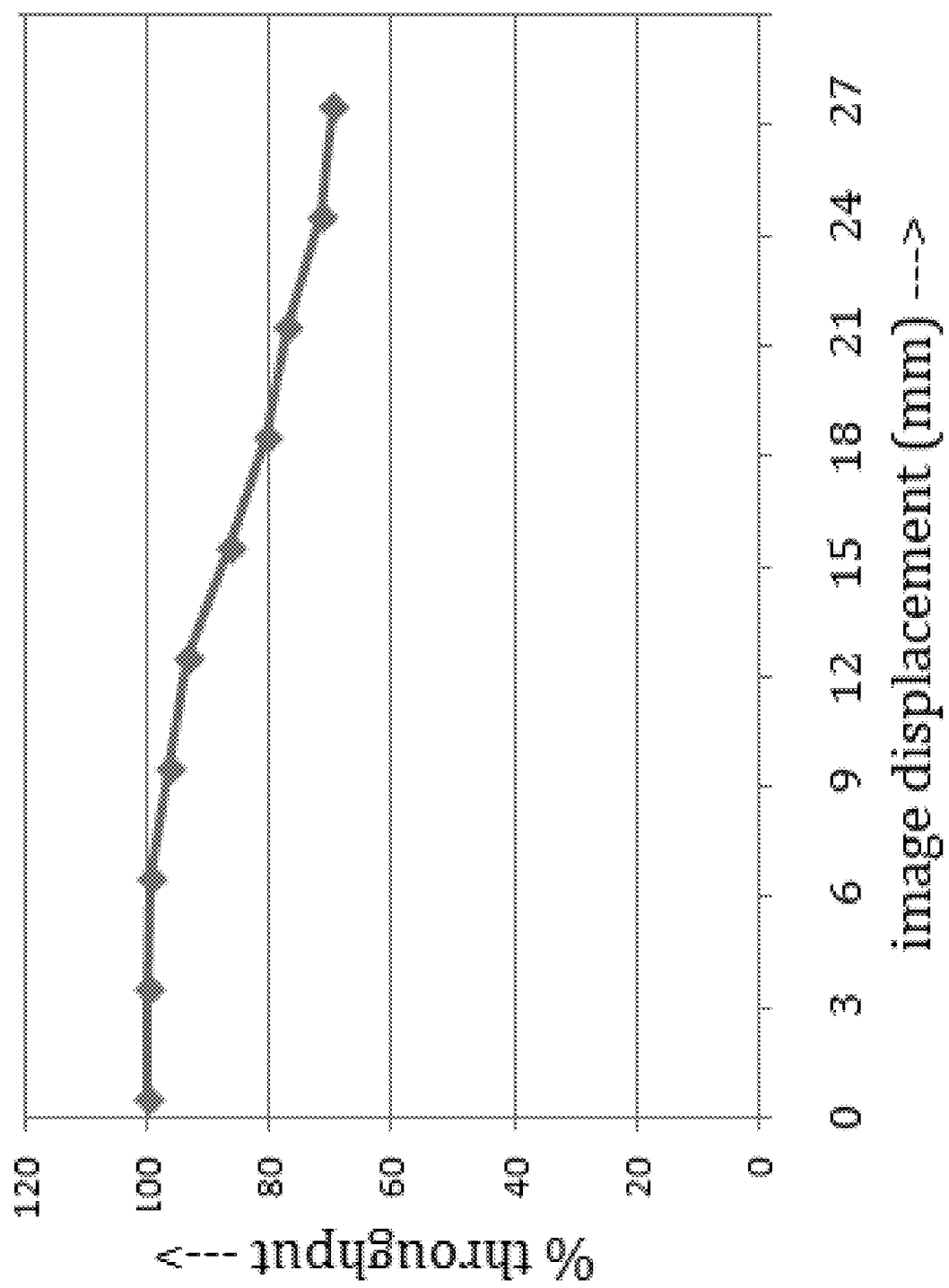
FIG. 6C: DROP OFF IN ILLUMINATION ACROSS FOV FOR THE LENS ARRANGEMENT OF FIG. 6A

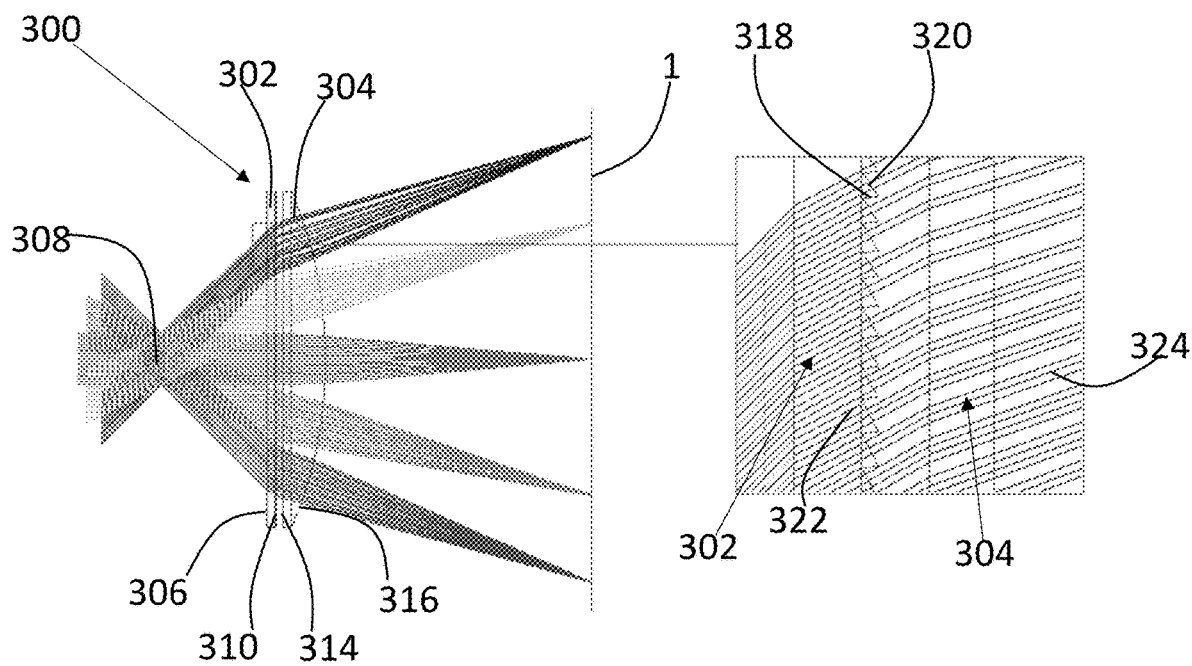
FIG. 7A: FRESNEL-ASPHERIC LENS COMBINATION

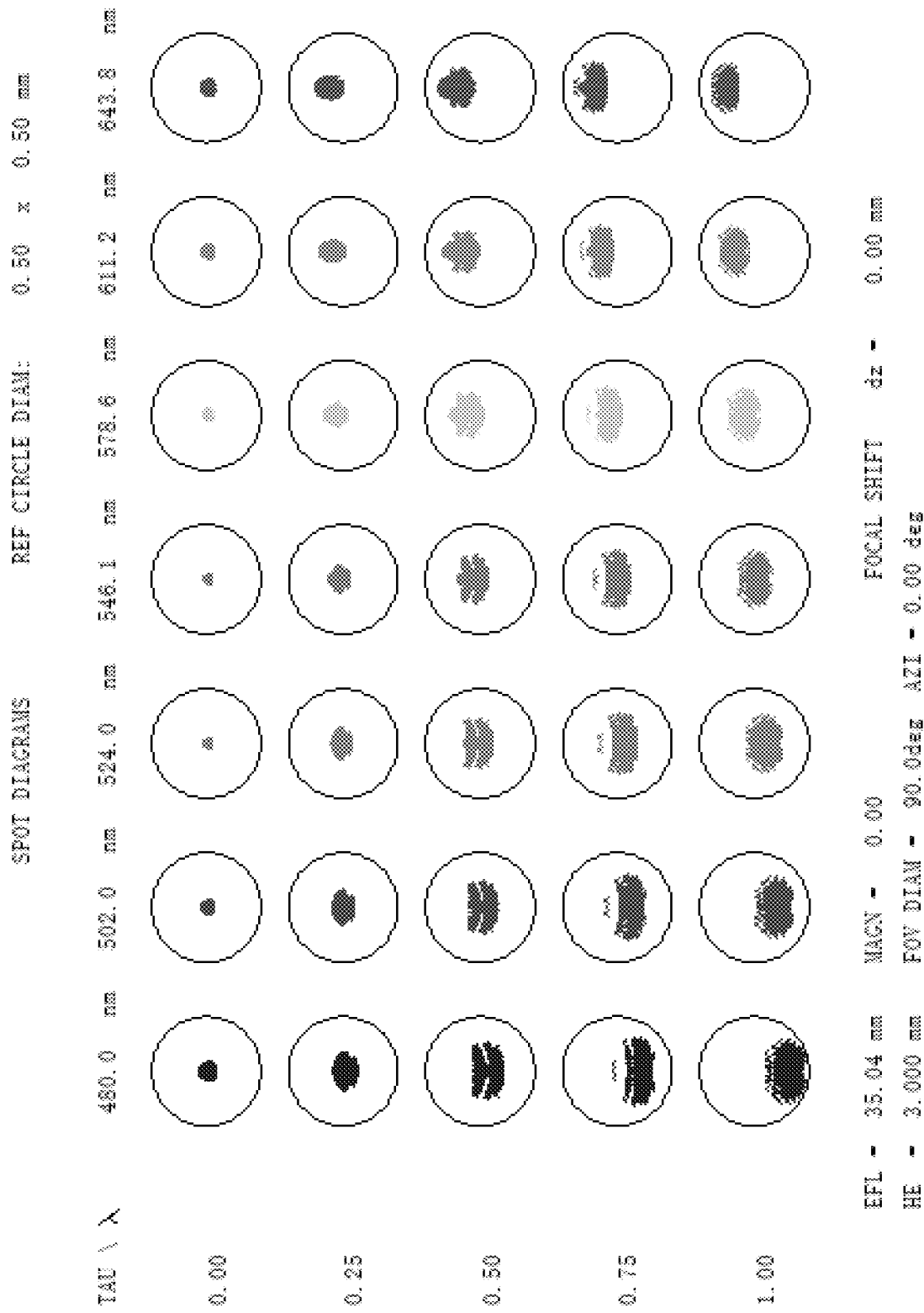
FIG. 7B: SPOT DIAGRAMS ASSOCIATED WITH THE LENS ARRANGMENT OF FIG. 7A

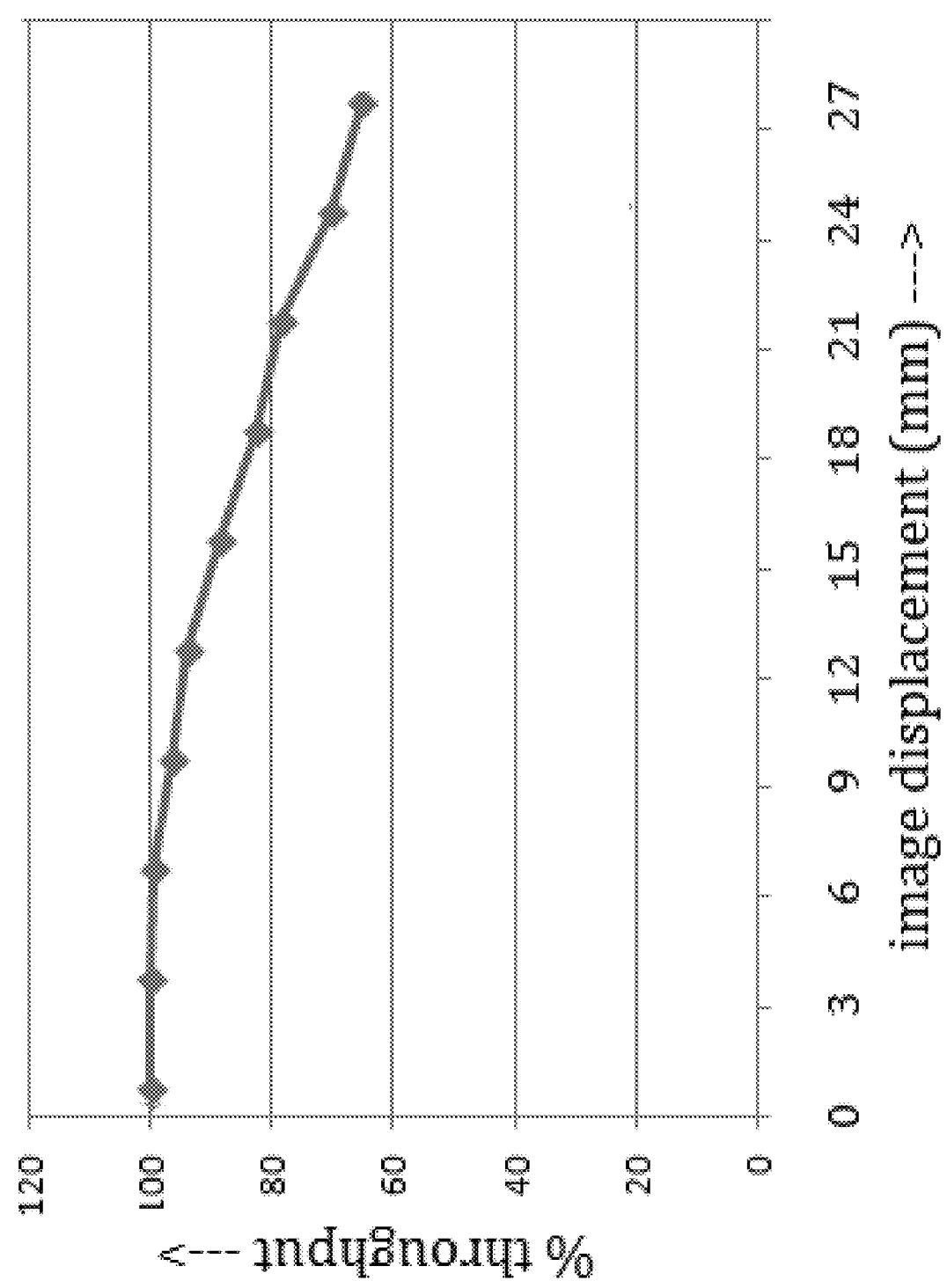
FIG. 7C: DROP OFF IN ILLUMINATION ACROSS FOV FOR THE LENS ARRANGMENT OF FIG. 7A

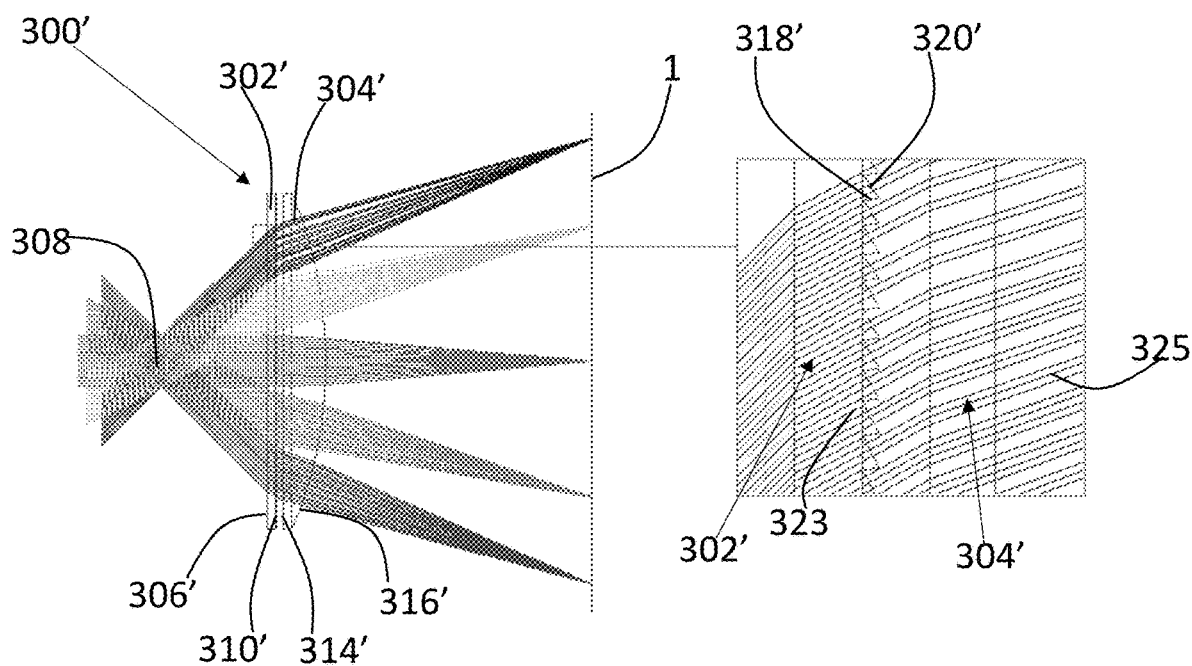
FIG. 8A: FRESNEL-ASPHERIC-BINARY LENS COMBINATION

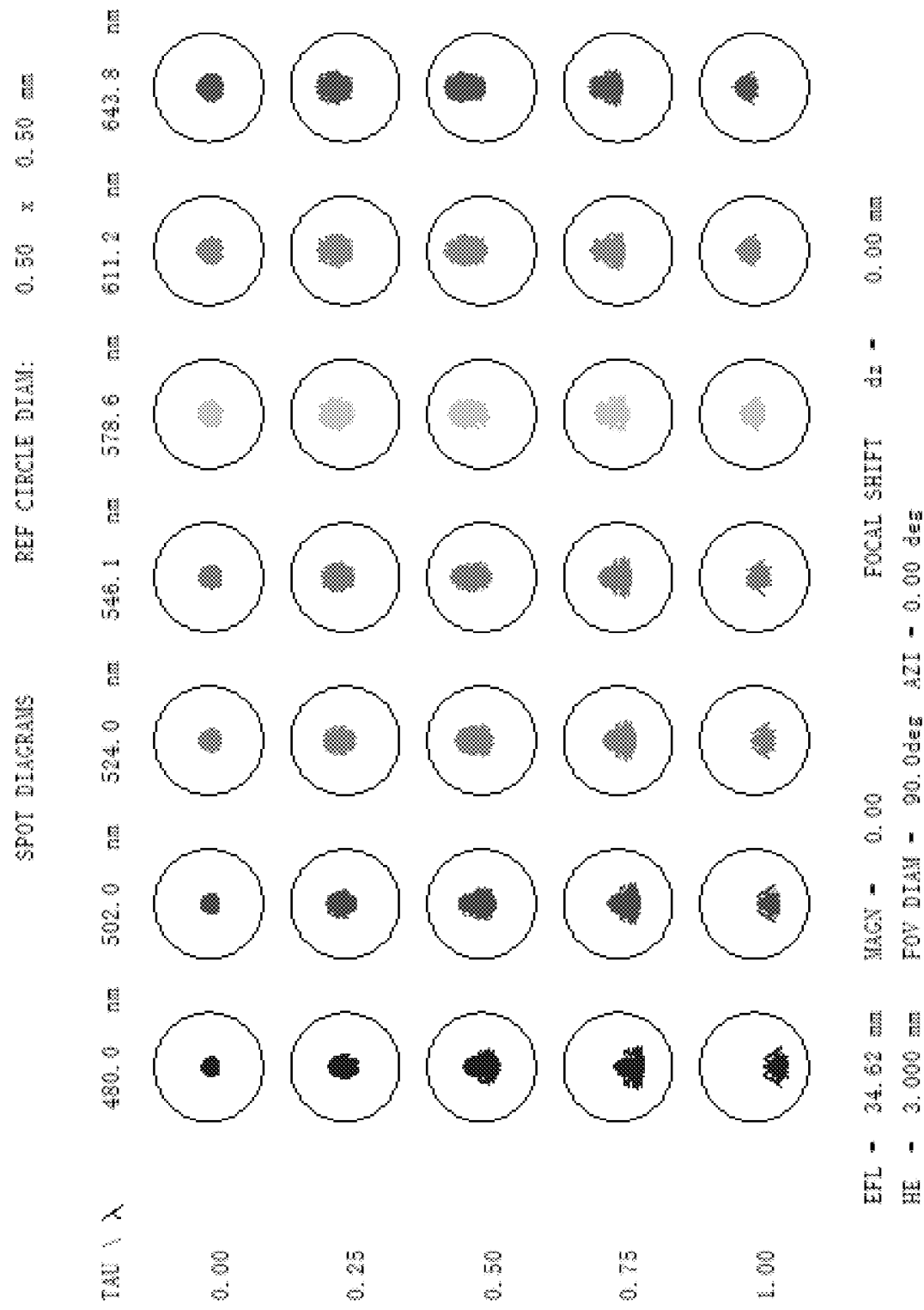
FIG. 8B: SPOT DIAGRAMS ASSOCIATED WITH THE LENS ARRANGEMENT OF FIG. 8A

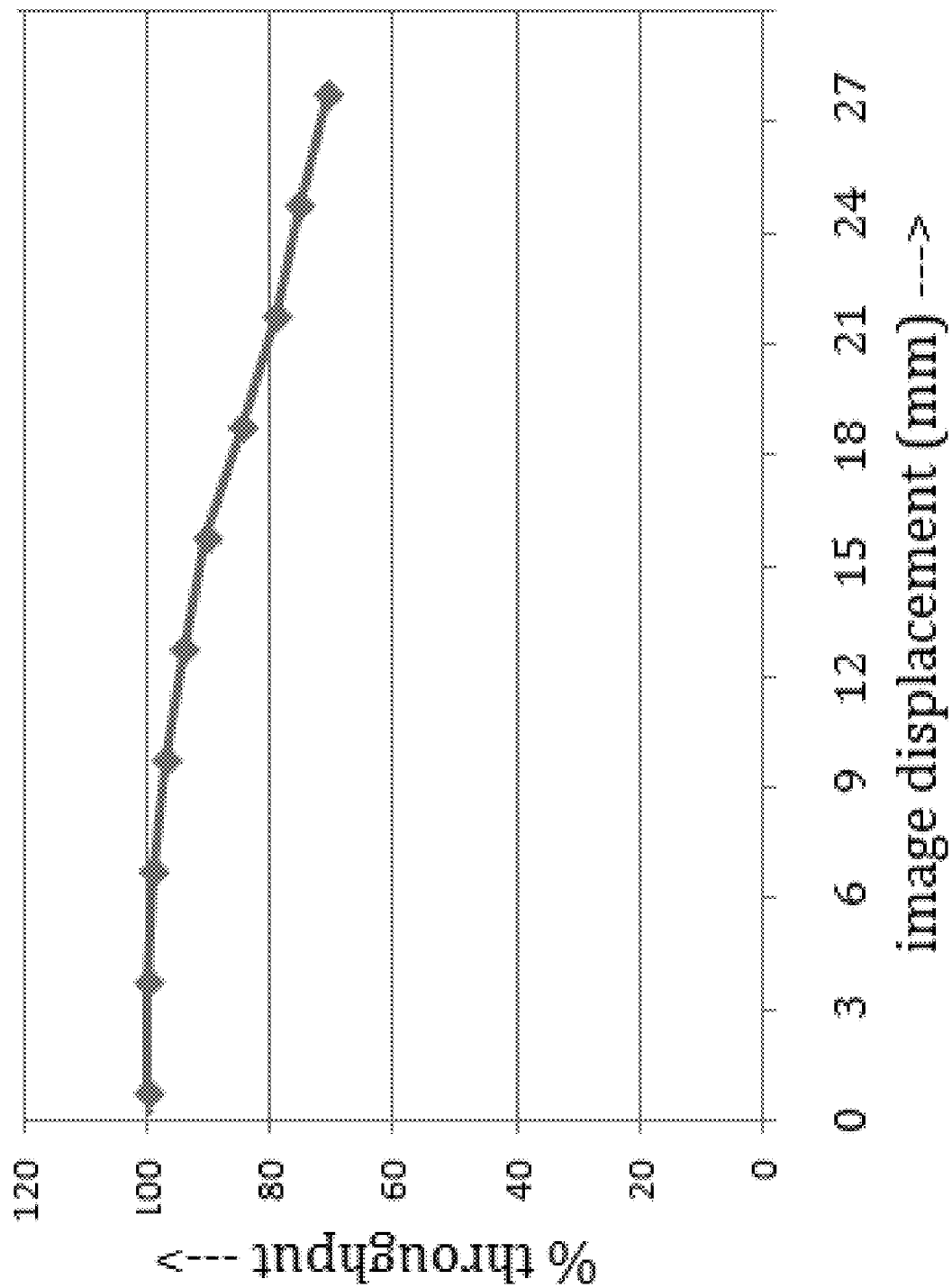
FIG. 8C: DROP OFF IN ILLUMINATION ACROSS FOV FOR THE LENS ARRANGEMENT OF FIG. 8A

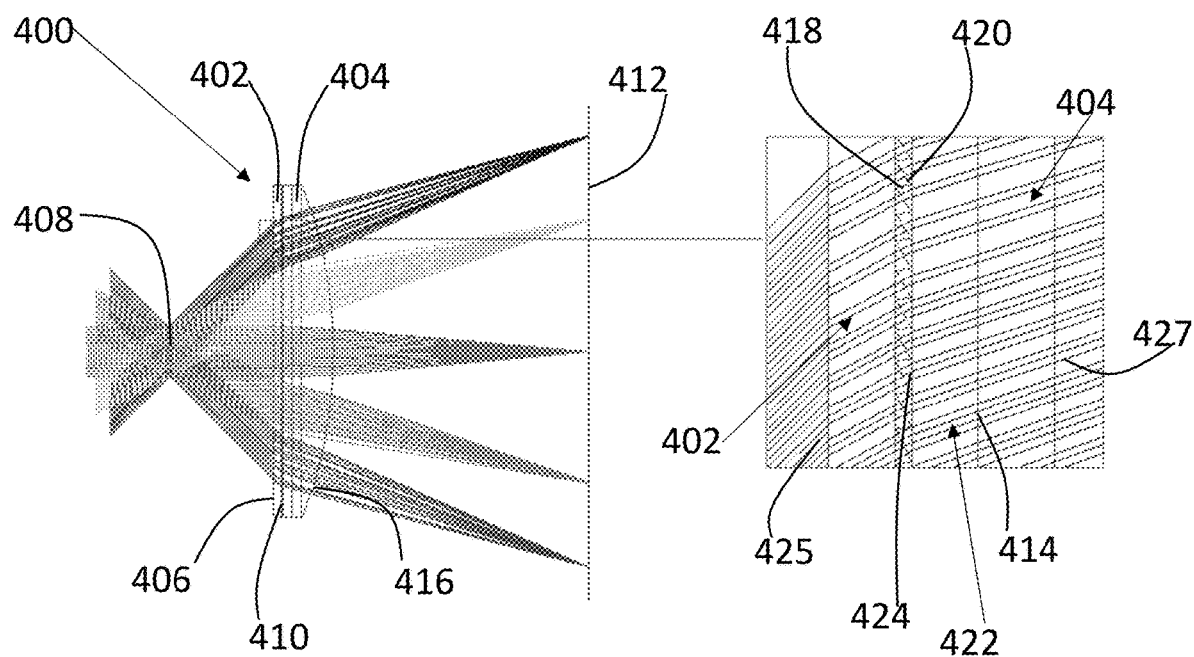
FIG. 9A: FRESNEL-ASPHERIC-IMBEDDED BINARY LENS COMBINATION

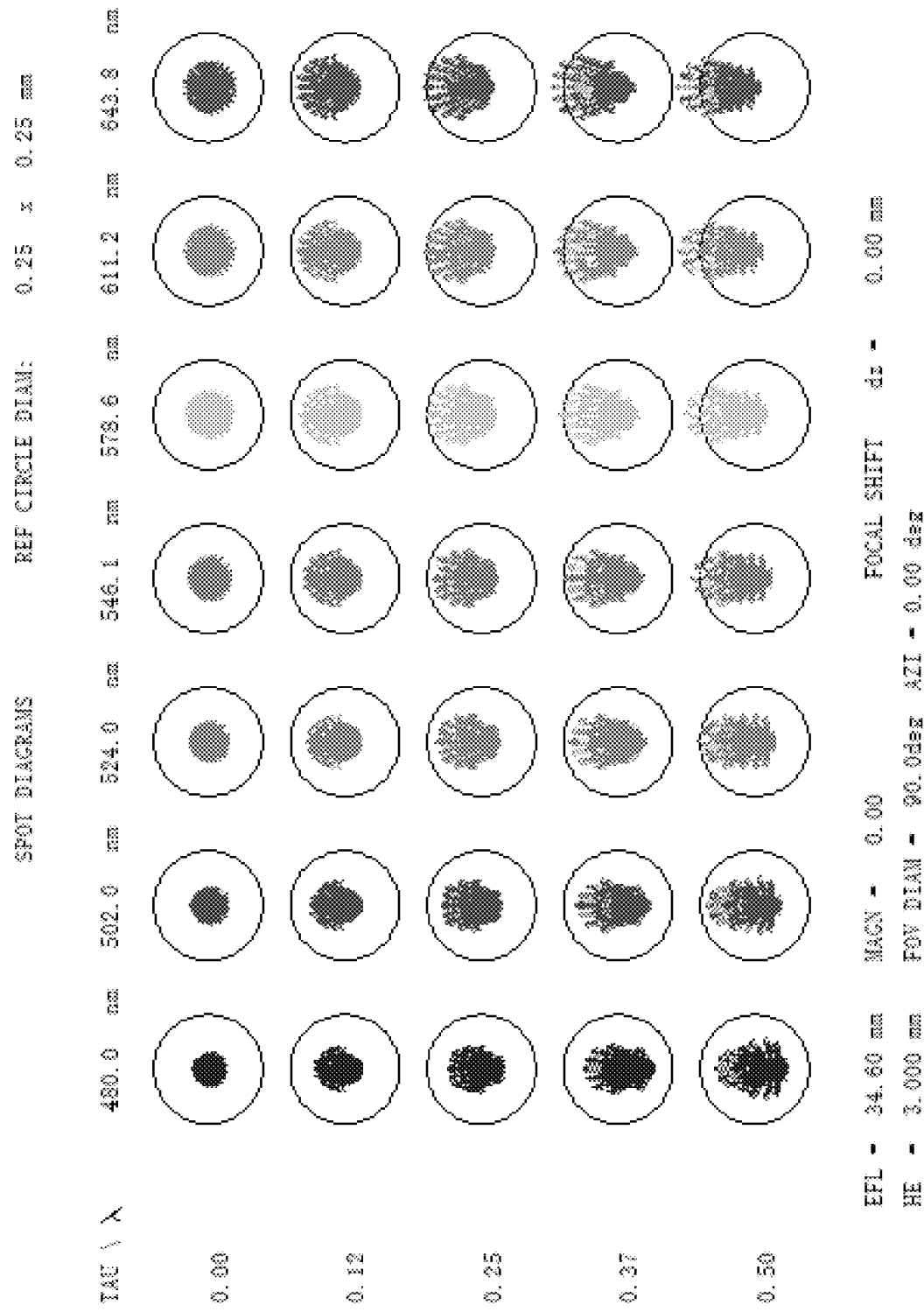
FIG. 9B: SPOT DIAGRAMS ASSOCIATED WITH THE LENS ARRANGEMENT OF FIGURE 9A

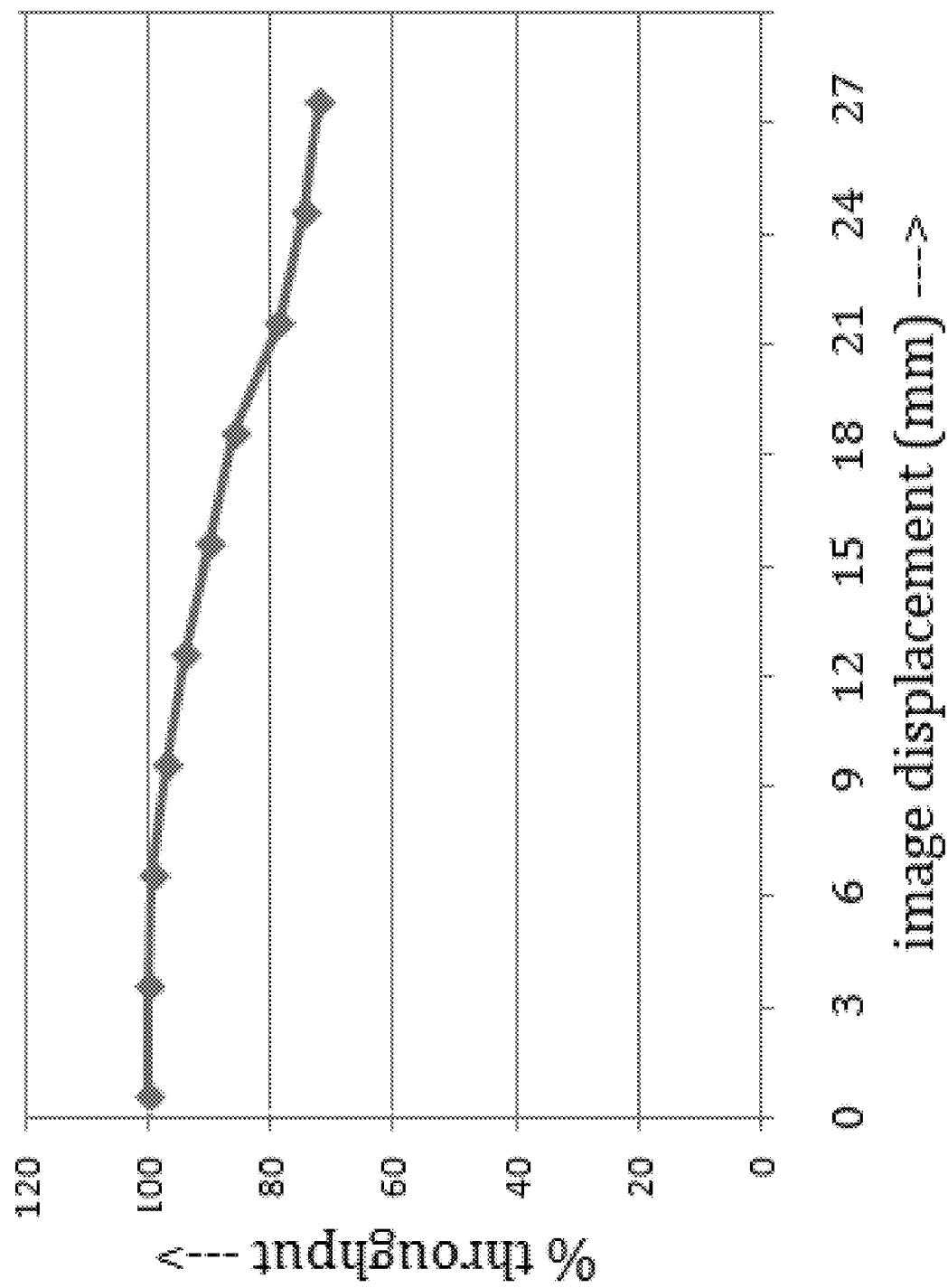
FIG. 9C: DROP OFF IN ILLUMINATION ACROSS FOV FOR THE LENS ARRANGEMENT OF FIGURE 9A

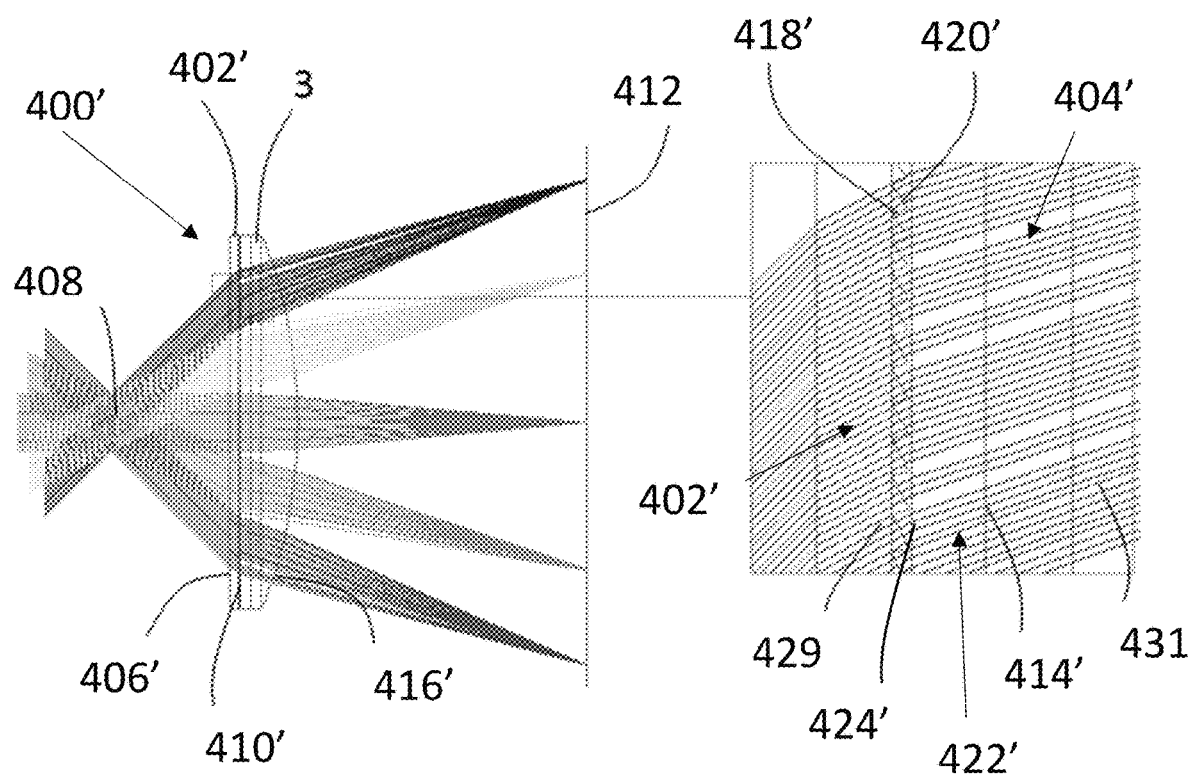
FIG. 10A: SLOPED FRESNEL-ASPHERIC-IMBEDDED BINARY LENS COMBINATION

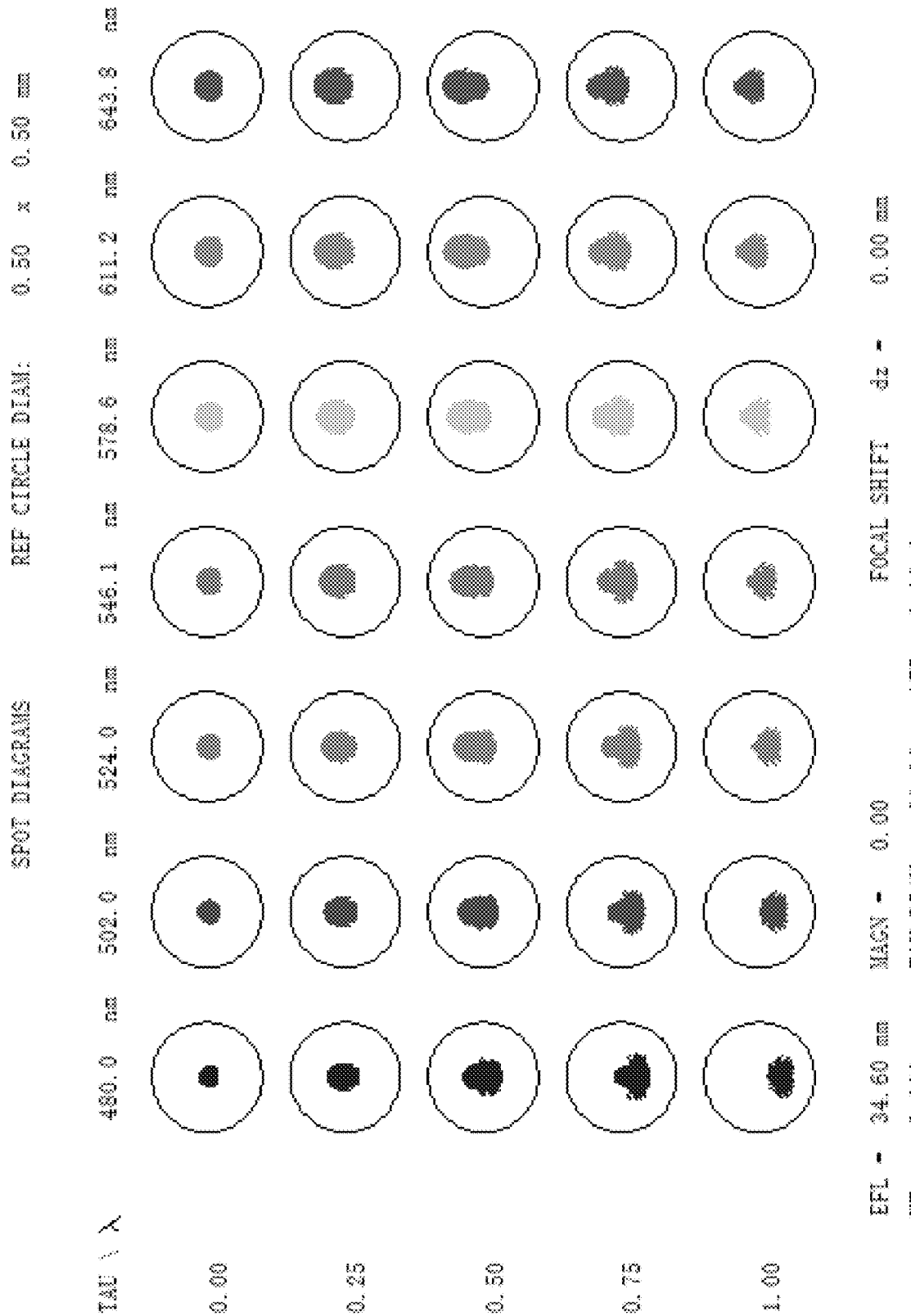
FIG. 10B: SPOT DIAGRAMS ASSOCIATED WITH THE LENS ARRANGEMENT OF FIG. 10A

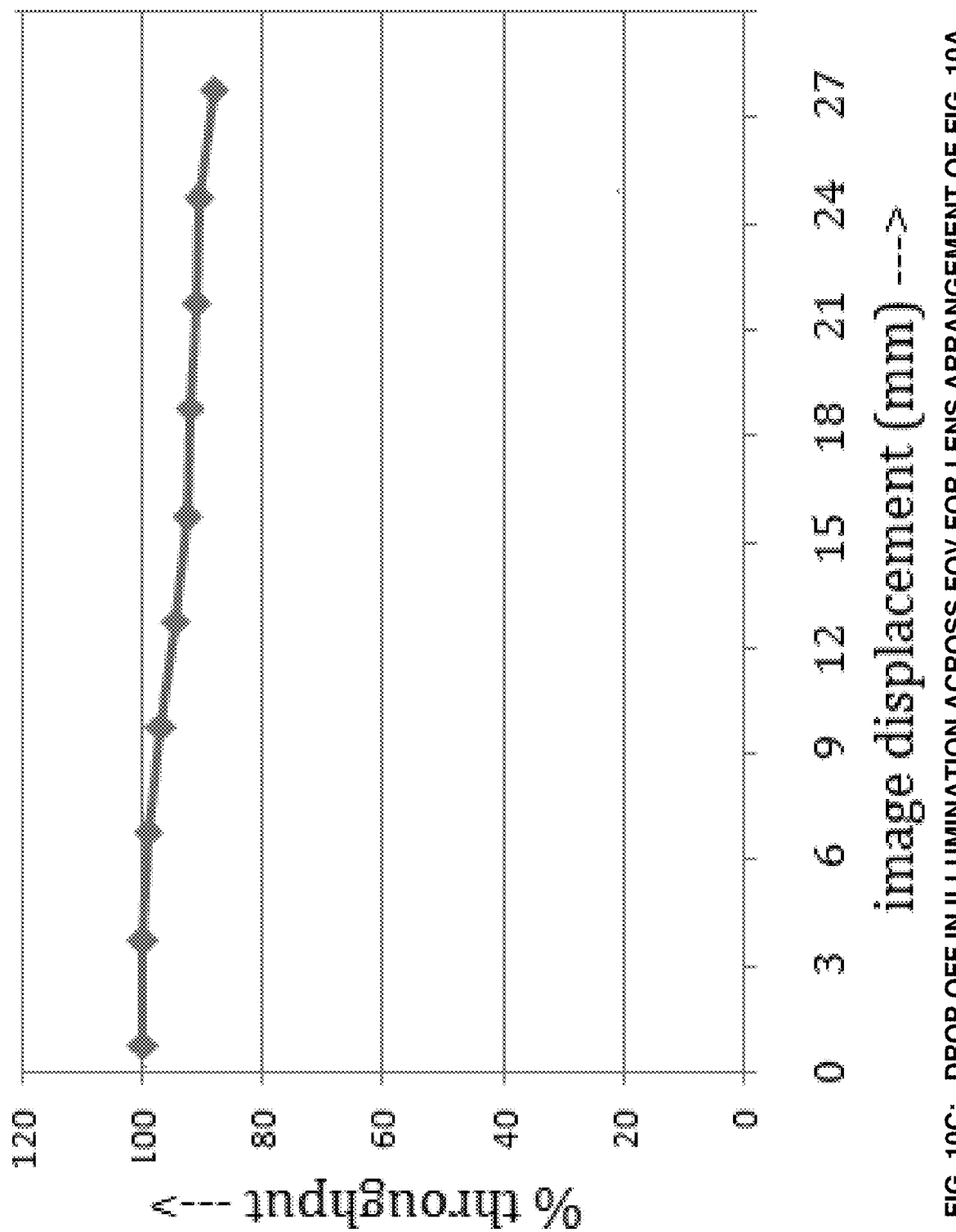
FIG. 10C: DROP OFF IN ILLUMINATION ACROSS FOV FOR LENS ARRANGEMENT OF FIG. 10A

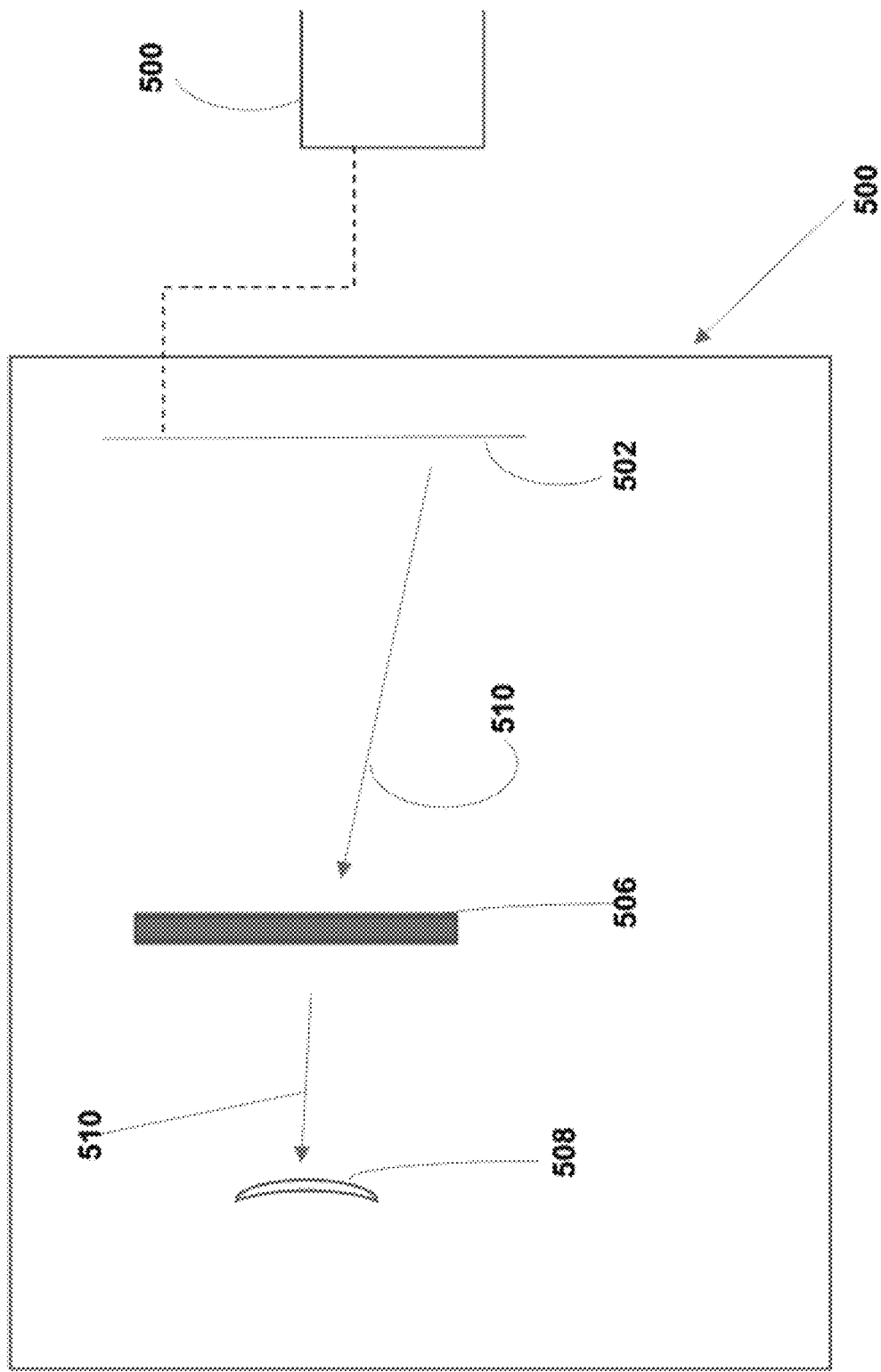

OPTICAL ARRANGEMENTS INCLUDING FRESNEL LENS ELEMENTS

CROSS-REFERENCE TO RELATED APPLICATIONS

The present application claims priority on U.S. Provisional Patent Application No. 62/311,141 filed on Mar. 21, 2016 which is incorporated by reference herein, in its entirety.

TECHNICAL FIELD

The present disclosure relates to optical arrangements. More specifically, but not exclusively, the present disclosure relates to optical arrangements that include at least one Fresnel lens element.

BACKGROUND

Virtual reality is a computer-simulated environment that can immerse the user in either real or virtual worlds. Although virtual reality systems have been around a few decades, it is only recently, with the advance of computer and display technologies, that they have become sophisticated enough to provide stereoscopic viewing with a wide field of view (FOV), low latency tracking and high resolution displays. The objective of immersion in virtual reality is to convince the user to perceive a non-physical world as if it was real. The concept of reality here refers more to the notion of perceptual plausibility. Several important factors influence immersion and these include but are not limited to system latency, display resolution, quality of the distortion correction, and FOV. Originally targeting military and aviation applications in the form of helmet-mounted displays and even flight simulators, head mounted displays (HMDs) are now becoming commonplace in gaming, entertainment, training, simulation, manufacturing/maintenance, design and medical applications.

Optical systems found in military and medical devices are generally complex, expensive to manufacture and usually offer a small FOV (less than 90° diagonally with a high resolution). Military and medical equipment applications can generally bear a small FOV and more weight, however, for business and consumer applications, cost, weight and FOV play an important role in determining the success of a product. Optical systems need to be simple, inexpensive, relatively easy to manufacture in large volumes and offer great immersion. Great immersion implies a large FOV. The function of the lens employed in gaming applications can be said to be less demanding as they function basically as an ocular or eyepiece magnifying the image presented on an electronic display. The type of lens typically employed ranges from a single element to as many as three. However, due to weight and size restrictions, the singlet form is often the most popular. Allowing either one or both surfaces to be aspherized, monochromatic aberration correction can be improved substantially over that for a spherical type lens, although chromatic aberration remains virtually invariant. Due to its low specific gravity and low production cost, the material of choice is usually a plastic such as acrylic, polycarbonate, cyclo-olefin polymer or copolymer. Performance however, remains compromised since specifications for the lens are extremely onerous with a field of view (FOV) often exceeding 90 degrees and an eye volume measuring as much as 12(W)×5(H)×5(D) mm in order to allow for comfortable viewing. Since only one type of material is used in the singlet lens construction, no chromatic aberration correction can be attained—this is in addition to the residual monochromatic aberration which is unavoidably present. With faster computers and increasingly sophisticated software, some of the color fringing resulting from chromatic aberration can be compensated for. However, this can only be regarded as a partial solution to the problem since the fringing changes with position of the eye within the eye-box.

Objects

An object of the present disclosure is to provide optical arrangements including at least one Fresnel lens element.

SUMMARY

An optical lens arrangement comprising: a first Fresnel lens element defining a flat surface side and an opposite faceted surface side defining wedge and draft faces, the flat surface side facing towards the eye of a user and the opposite faceted surface side facing away from the eye of the user; and a second lens element interfacing with the faceted surface side of first Fresnel lens and being selected from the group consisting of: a second Fresnel lens element, a singlet lens element, a doublet lens element and any combination thereof, wherein the first Fresnel lens is proximal relative to the eye of the user and the second lens element is distal relative to the eye of the user.

In an embodiment, the draft faces of the first Fresnel element comprise a black absorbing coating or dye. In an embodiment, the draft faces of the first Fresnel element comprise a rough diffusive finish. In an embodiment, the draft faces of the first Fresnel element comprise an anti-reflective coating.

In an embodiment, lens arrangement defines an optical axis, a draft angle being defined between the draft faces and the optical axis of the lens arrangement in a plane in which the optical axis lies, wherein the draft angles are arranged for providing for light rays passing through the optical lens arrangement to be almost substantially parallel to the draft faces for a specific pupil position.

In an embodiment, the optical lens arrangement further comprises a diffractive structure at least one optical surface defined by either one of the first Fresnel lens element or the second lens element.

In an embodiment, the second lens element comprises a second Fresnel lens defining a flat surface side and an opposite faceted surface side defining wedge and draft faces. In art embodiment, the faceted surface side of the second Fresnel lens faces towards the faceted side of the first Fresnel lens and the opposite flat surface side of the second Fresnel lens faces away from the first Fresnel lens. In an embodiment, the flat surface side of the second Fresnel lens faces towards the faceted side of the first Fresnel lens and the opposite faceted surface side of the second Fresnel lens faces away from the first Fresnel lens. In an embodiment, the the draft faces of the second Fresnel element comprise a black absorbing coating or dye. In an embodiment, the draft faces of the second Fresnel element comprise a rough diffusive finish. In an embodiment, the draft faces of the second Fresnel element comprise an anti-reflective coating. In an embodiment, the lens arrangement defines an optical axis, a draft angle being defined between the draft faces and the optical axis of the lens arrangement in a plane in which the optical axis lies, wherein the draft angles are arranged for providing for light rays passing through the optical lens arrangement to be almost substantially parallel to the draft faces for a specific pupil position.

In an embodiment, the second lens element comprises a singlet lens element. In an embodiment, the singlet lens element comprises an aspheric lens. In an embodiment, the aspheric lens comprises a plano-convex aspheric lens defining a flat surface side and an opposite curved surface side, the flat surface side facing towards the faceted side of the first Fresnel lens element, the opposite curved surface side facing away from the first Fresnel lens element. In an embodiment, the flat surface side of the Fresnel lens comprises a diffractive surface. In an embodiment, the diffractive surface comprises a binary surface. In an embodiment, the singlet lens element comprises a rear surface facing towards the faceted side of the first Fresnel lens element and a front surface facing away from the first Fresnel lens. In an embodiment, the rear surface of the singlet lens comprises an embedded binary surface. In an embodiment, the third lens element is mounted to the rear surface of the singlet lens. In an embodiment, the third lens element comprises a binary surface facing towards the faceted surface side of the first Fresnel lens.

In an embodiment, the second lens element comprises a doublet lens element.

In an embodiment, the distance between the first Fresnel lens element and the second lens element is from about 0 mm to about 5 mm.

In an embodiment, the lens arrangement is mountable to a head mounted device to be worn by a user for displaying a video image to the user.

In accordance with another aspect of the present disclosure, there is provided a head mounted device to be worn by a user for displaying a video image to the user, the head mounted device comprising: a data image processor; a display screen mounted to the head mounted device and being in communication with the data image processor for displaying the video image to the user; and an optical lens arrangement according as defined herein, wherein the optical lens arrangement is positioned between the display screen and the eyes of the user when the head mounted device is worn by the user.

In accordance with another aspect of the present disclosure, there is provided a method of making a lens arrangement comprising: providing a first Fresnel lens element defining a flat surface side and an opposite faceted surface side defining wedge and draft faces, the flat surface side being positioned for facing towards the eye of a user and the opposite faceted surface side being positioned for facing away from the eye of the user; positioning a second lens element in front of the first Fresnel element for interfacing with the faceted side of the first Fresnel lens, the second lens element being selected from the group consisting of: a second Fresnel lens element, a singlet lens element, a doublet lens element and any combination thereof.

In an embodiment, the method further comprises applying a black absorbing coating or dye to the draft faces of the first Fresnel element. In an embodiment, the method further comprises providing the draft faces with a rough finish In an embodiment, the method further comprises applying an anti-reflective coating on the draft faces.

In an embodiment of the method, the lens arrangement defines an optical axis, a draft angle being defined between the draft faces and the optical axis of the lens arrangement in a plane in which the optical axis lies, the method further comprising arranging the draft angles for providing for light rays passing through the optical lens arrangement to be almost substantially parallel to the draft faces.

In an embodiment of the method, the method further comprises providing a diffractive structure to at least one optical surface defined by either one of the first Fresnel lens element or the second lens element.

In an embodiment of the method, the second lens element comprises a second Fresnel lens defining a flat surface side and an opposite faceted surface side defining wedge and draft faces. In an embodiment, the method further comprising positioning the second Fresnel lens element so that the faceted surface side thereof faces the faceted side of the first Fresnel lens. In an embodiment, the method further comprises positioning the second Fresnel lens element so that the flat surface side thereof faces the faceted side of the first Fresnel lens. In an embodiment, the method further comprises applying a black absorbing coating or dye to the draft faces of the second Fresnel element. In an embodiment, the method further comprises providing the draft faces of the second Fresnel element with a rough diffusive finish. In an embodiment, the method further comprises applying an anti-reflective coating on the draft faces of the second Fresnel element.

In an embodiment of the method, the lens arrangement defines an optical axis, a draft angle being defined between the draft faces and the optical axis of the lens arrangement in a plane in which the optical axis lies, the method further comprising arranging the draft angles of the second Fresnel lens element for providing for light rays passing through the optical lens arrangement to be almost substantially parallel to the draft faces of the second Fresnel lens element.

In an embodiment, the method further comprises mounting a third lens element to the second lens element interposed between the first Fresnel lens element and the second lens element.

In an embodiment, the method further comprises positioning the second lens element at a distance from about 0 mm to about 5 mm from the first Fresnel lens element.

In accordance with an aspect of the present disclosure, there is provided a method of making a head mounted device to be worn by a user for displaying a video image to the user, the head mounted device comprising a data mage processor and a display screen mounted to the head mounted device and being in communication with the data image processor for displaying the video image to the user; the method comprising: mounting an optical lens arrangement as defined herein to the head mounted device to be positioned between the display screen and the eyes of the user when the head mounted device is worn by the user.

Optical arrangements are also known as ocular lens arrangements, also known as eyepiece, assemblies, constructions, systems, or configurations.

Other objects, advantages and features of the present disclosure will become more apparent upon reading of the following non-restrictive description of illustrative embodiments thereof, given by way of example only with reference to the accompanying drawings.

BRIEF DESCRIPTION OF THE DRAWINGS

In the appended drawings:

FIG. 1A is a schematic illustration of a prior art ocular lens being used over a 90 degrees FOV;

FIG. 1B depicts spot diagrams associated with the lens of FIG. 1 as a function of both field position and wavelength (Tau is fractional field coordinate, so Tau=1 represents edge of the FOV);

FIG. 2A is a schematic illustration of a Fresnel lens operating as an ocular lens with faceted surface toward the pupil (eye box);

FIG. 2b depicts spot diagrams associated with the lens arrangement of FIG. 2A;

FIG. 2C depicts drop-off in illumination across FOV associated with the lens arrangement of FIG. 2A;

FIG. 3A is a schematic illustration of a typical Fresnel lens operating as an ocular lens with faceted surface away from the pupil (eye box);

FIG. 3B depicts spot diagrams associated with the lens arrangement of FIG. 3a;

FIG. 3C depicts drop-off in illumination (resulting from blocking from draft faces) across FOV associated with the lens arrangement of FIG. 3A;

FIG. 4 is a schematic illustration of show beam trajectories through various Fresnel surfaces shown in (a), (b) and (c) (expanded views);

FIG. 5A is a schematic illustration of a non-restrictive illustrative embodiment of the lens arrangement in accordance with the present disclosure comprising a pair of Fresnel lenses with faceted surfaces facing towards one another;

FIG. 5B depicts spot diagrams associated with the lens arrangement of FIG. 5A;

FIG. 5C depicts drop-off in illumination across FOV associated with the lens arrangement of FIG. 5A;

FIG. 6A another non-restrictive illustrative embodiment of the lens arrangement in accordance with the present disclosure comprising a pair of Fresnel lenses with both faceted surfaces facing away from pupil (eye box);

FIG. 6B depicts spot diagrams associated with the lens arrangement of FIG. 6A;

FIG. 6C depicts drop-off in illumination across FOV associated with the lens arrangement of FIG. 6A;

FIG. 7A shows a further non-restrictive illustrative embodiment of the lens arrangement in accordance with the present disclosure comprising a Fresnel lens and singlet lens combination;

FIG. 7B depicts spot diagrams associated with the lens arrangement of FIG. 7A;

FIG. 7C depicts drop-off in illumination across FOV associated with the lens arrangement of FIG. 7A;

FIG. 8A shows yet another non-restrictive illustrative embodiment of a lens arrangement in accordance with the present disclosure comprising a Fresnel lens and singlet lens combination with a binary surface;

FIG. 8B depicts spot diagrams associated with the lens arrangement of FIG. 8a;

FIG. 8C depicts drop-off in illumination across FOV associated with the lens arrangement of FIG. 8A;

FIG. 9A shows yet a further non-restrictive illustrative embodiment of the lens arrangement in accordance with the present disclosure comprising a Fresnel lens and singlet lens combination with a binary surface imbedded within actual material;

FIG. 9B depicts spot diagrams associated with the lens arrangement of FIG. 9A;

FIG. 9C depicts drop-off in illumination across FOV associated with the lens arrangement of FIG. 9a;

FIG. 10A shows still another non-restrictive illustrative embodiment of the lens arrangement in accordance with the present disclosure comprising a Fresnel lens having sloped draft faces and singlet lens combination with a binary surface imbedded within bulk material;

FIG. 10B depicts spot diagrams associated with the lens arrangement of FIG. 10A;

FIG. 10C depicts drop-off in illumination across FOV associated with the lens arrangement of FIG. 10A; and FIG. 11 is a schematic illustration of a Head-mounted device including the optical lens arrangement of the present disclosure in accordance with a non-restrictive illustrative embodiment thereof.

DETAILED DESCRIPTION OF ILLUSTRATIVE EMBODIMENTS

Generally stated and in accordance with a non-restrictive illustrative embodiment, there is provided an optical lens arrangement comprising a first Fresnel lens element and a second lens element. The first Fresnel lens element defines a flat surface side and an opposite faceted surface side defining wedge and draft faces. The flat surface side faces towards the eye of a user and the opposite faceted surface side faces away from the eye of the user. The second lens element interfaces with the faceted surface side of first Fresnel lens. The second lens element is selected from the group consisting of: a second Fresnel lens element, a singlet lens element, a doublet lens element and any combination thereof. The first Fresnel lens is proximal relative to the eye of the user and the second lens element is distal relative to the eye of the user. Head mounted devices (HMD) including these optical ions arrangements are provided. Methods of making such optical lens arrangements and HMDs are also provided.

In accordance with a non-restrictive illustrative embodiment, there is provided an optical or ocular lens, lens arrangement, lens assembly, lens construction, lens system, or lens configuration that provides excellent image quality over a large field of view for a large pupil with a low total weight. The lens arrangement comprises at least one Fresnel lens element and either a second Fresnel lens or a more conventional lens such as a singlet or doublet or a combination of each with the possible inclusion of a diffractive surface such as a binary or kinoform surface at one of the optical surfaces and the possible inclusion of a black absorbing coating on the draft faces of the Fresnel lens and/or diffusive drafts. It finds an application in the virtual and augmented reality domains as an ocular lens for magnifying imaging displays.

In accordance with an aspect of the disclosure, the optical arrangement provides for the possible inclusion of a diffractive surface such as a binary or kinoform surface at one of the optical surfaces and the possible inclusion of a black absorbing coating on the draft faces of the Fresnel lens and/or diffusive drafts and/or anti-reflective coating.

The powers associated with the various lens groups are such as to achieve good aberration correction. Besides the arrangements comprising a pair of Fresnel lenses, good performance can be obtained by employing a relatively simple arrangement comprising a flat Fresnel lens with its faceted side towards the conventional lens which is a plano-convex lens, whose curved surface may be aspheric, with its plane surface in close proximity to said faceted surface of Fresnel lens. As mentioned, a further example of the present arrangement is to include a diffractive surface on one of the elements; its presence required primarily to eliminate chromatic aberration from the Fresnel/singlet combination. A black absorbing coating can be applied on the draft faces of the Fresnel lens to effectively eliminate the additional ghosting and stray light caused by these draft faces. The draft faces can be given a rough diffusive finish and/or have a porous anti-reflective coating to furthermore decrease ghosting and stray light.

In HMD eyepiece, using a Fresnel lens instead of a traditional lens decreases the weight of the eyepiece and the length of the optical system as well as offering more degrees of freedom for aberration correction. This allows for a higher FOV and better immersion.

The at least one Fresnel lens element and the either a second Fresnel lens or a more conventional lens such as a singlet or doublet or a combination of each of the lens arrangement share the power appropriately between them to produce a magnified image having good image quality.

The residual chromatic aberration found with this Fresnel/singlet combination can be effectively eliminated by introducing a diffractive surface to one of the surfaces within this assembly and the additional ghost images caused by the draft faces of the Fresnel lens can be eliminated by adding a black absorbing layer on the draft faces which can be diffusive for optimal performance. The inclusion of a diffractive surface at one of the surfaces within the optical lens arrangement allows for the virtual elimination of the residual chromatic aberration. Fresnel lenses comprise a succession of concentric lenses called wedge faces. Each wedge face is separated from the next by a draft face that does not contribute to imaging. In order to reduce unwanted blocking (and therefore decreased throughput) of the rays passing through the system due to draft faces, these faces are orientated so as to reduce the angles of incidence of the rays at those said elements. Moreover, blocking can be minimized by allowing the draft faces to be appropriately inclined. Furthermore, by applying a black absorbing coating on the draft faces, ghost images can be diminished. Additionally, ghosting can be diminished by giving the draft faces a rough finish, causing a general loss of contrast which is less objectionable to the user.

In a non-restrictive illustrative embodiment, there is provided a Fresnel lens-singlet combination in which the singlet is the closer of the two elements to the display and the faceted side of the Fresnel lens is towards the singlet and the surface of the singlet has the bulk of the power on the opposite side to the Fresnel lens. More pointedly an even simpler configuration along the same lines are flat surfaces (apart from the actual facet structure) on both surfaces of the Fresnel lens and the adjacent surface of the singlet with an aspheric surface on the other. A configuration having a flat surface next to the viewer's eye allows for a higher FOV for the same eye-relief and lens diameter. Including a diffractive surface on one of the components effectively eliminates color fringing caused by lateral chromatic aberration introduced by the refracting elements. Including a black absorbing coating and/or rough finish on the draft faces of the Fresnel lens with the possible inclusion of an anti-reflective coating on the draft faces would effectively eliminate the additional ghosting caused by the draft faces of the Fresnel lens.

With reference, to the appended Figures, non-restrictive illustrative embodiments will be herein described so as to further exemplify the disclosure only and by no means limit the scope thereof.

FIG. 1A shows a prior art ocular 10 using an aspheric singlet lens 12 to magnify the image on a display 14. Beam trajectories 16 are plotted for various field positions. For optimum performance, over both a large field of view and large eye-box, the front surface 18 of the lens 12, the one closer to the display 14, has substantially more power than the rear surface 20. While both surfaces, 18 and 20, may be aspheric to squeeze out maximum performance, it is more important for the front surface 18 to be aspherized.

Typical figures for the FOV and eye-box would be around 90 degrees and 12 mm(H)×5 mm(V)×5 mm(D), respectively, although eyepieces having an FOV higher than 120° have been produced using the ocular arrangements of the present disclosure. These figures would provide the user of the visual unit an acceptably sized FOV and reasonable forgiveness in eye movement.

FIG. 1B depicts spot diagrams associated with a typical prior art ocular 10 as illustrated in FIG. 1A. These are plotted as a function of both field position and wavelength and exhibit both monochromatic and chromatic aberration, the latter manifesting itself mostly as color fringing increasing roughly linearly with field of view. While it is possible to reduce these aberrations by allowing the optics to be more complex, this approach has its own disadvantages. Introducing a second element so that the singlet is now replaced by a doublet, while possibly reducing chromatic aberration, assuming of course that the doublet comprises both a crown and flint type material results in a substantially bulkier arrangement. This increase in size and correspondingly increase in weight would have a negative impact on the comfort afforded the wearer of such a device.

Fresnel lenses have long been employed in optical devices where the ratio of lens diameters to focal lengths is large and at the same time image quality is not that important. This is the reason they have found applications in condenser arrangements for illumination purposes, such as lighthouses, copying machines, etc.

FIG. 2A shows a Fresnel lens 100 having a faceted surface side 102 and a flat surface side 104. The faceted surface side 102 is positioned towards the eye 106 of a user. The flat surface side 104 is positioned towards a display screen 108. The faceted surface side 102 includes wedge faces 110 and draft faces 112. The light trajectory is from left to right, bad light rays 114 are shown to hit the draft faces 112 of the Fresnel lens 100, while good light rays 116 are shown to pass through the Fresnel lens 100. FIG. 2B shows the spot diagrams associated with Fresnel lens 100. FIG. 2C shows the drop off in illumination across the field of view for the Fresnel lens 100.

FIG. 3A shows a Fresnel lens 100' having a faceted surface side 102' and a flat surface side 104'. The flat surface side 104' is positioned towards the eye 106 of a user. The faceted surface side 102' is positioned towards a display screen 108. The faceted surface side 102' includes wedge faces 110' and draft faces 112'. The light trajectory is from left to right, bad light rays 114 are shown to hit the draft faces 112 of the Fresnel lens 100', while good light rays 118 are shown to pass through the Fresnel lens 100'. FIG. 3B shows the spot diagrams associated with Fresnel Ions 100'. FIG. 3C shows the drop off in illumination across the field of view for the Fresnel lens 100'.

As shown in FIGS. 2A-2C and 3A-3C, employing a Fresnel lens as an ocular has limited success as the faceted surface of the Fresnel lens has serious issues with handling rays having large angles of incidence. Rays passing through the Fresnel surface can fall by being refracted or reflected by a draft face. While allowing the Fresnel lens to be used in its nominally reverse orientation (FIGS. 3A-3C) can be seen to improve the situation, the performance still falls well short of what would be considered as acceptable by the skilled artisan.

Ray trajectories through various Fresnel surfaces are depicted in FIG. 4 where (a) shows a large incidence angle on individual facets; (b) shows small incidence angle on individual facets; and (c) is similar to (b) but with sloped draft faces to minimize shadowing. It can be appreciated by one having skill in the art that allowing the draft of the facet to be appropriately inclined, blocking of the rays can be minimized thereby allowing an appreciable improvement in the overall performance of the optical arrangement.

FIG. 5A shows a lens arrangement 200 comprising a first or proximal Fresnel lens element 202 and a second or distal Fresnel lens element 204. The first Fresnel lens element 202 includes a flat surface side 206 facing towards the eye 208 and an opposite faceted surface side 210 facing towards the display screen 212. The second Fresnel lens element 204 includes a faceted surface side 214 interfacing with the faceted surface side 210 of the first Fresnel lens element 202 and an opposite flat surface side 216 facing the display screen 212. The faceted surface side 210 of the first Fresnel lens element 202 defines wedge faces 218 and draft faces 220. The faceted surface side 214 of the second Fresnel lens element 204 defines wedge faces 222 and draft faces 224. FIG. 5A shows a bad ray 226 hitting a draft face 220 of the first Fresnel lens element 202, a bad ray 228 hitting a draft face 224 of the second Fresnel lens element 204 and a good ray 230 making it through both the first and second Fresnel lens elements 202 and 204, respectively. FIG. 5B shows the spot diagrams associated with the lens arrangement 200. FIG. 5C shows the drop off in illumination across the field of view for the lens arrangement 200.

FIG. 6A shows a lens arrangement 200' comprising a first or proximal Fresnel lens element 202' and a second or distal Fresnel lens element 204'. The first Fresnel lens element 202' includes a flat surface side 206' facing towards the eye 208 and an opposite faceted surface side 210' facing towards the display screen 212. The second Fresnel lens element 204' includes a faceted surface side 214' facing the display screen 212 and an opposite flat surface side 216' interfacing with the faceted surface side 210' of the first Fresnel lens element 202'. The faceted surface side 210' of the first Fresnel lens element 202' defines wedge faces 218' and draft faces 220'. The faceted surface side 214' of the second Fresnel lens element 204' defines wedge faces 222' and draft faces 224'. FIG. 6A shows a bad ray 227 hitting a draft face 220' of the first Fresnel lens element 202', a bad ray 229 hitting a draft face 224' of the second Fresnel lens element 204' and a good ray 231 making it through both the first and second Fresnel lens elements 202' and 204', respectively. FIG. 6B shows the spot diagrams associated with the lens arrangement 200'. FIG. 6C shows the drop off in illumination across the field of view for the lens arrangement 200'.

Sharing the power between a pair of Fresnel lenses orientated as illustrated in FIGS. 5A and 6A, and shows an improvement over a single element (see FIGS. 5B and 6B).

Besides the use of a pair of Fresnel lenses, an alternative approach to that employed in prior art is the combination of a Fresnel lens and a singlet lens. Since the Fresnel works well in situations where the rays incident on the faceted surface are close to normal, the Fresnel lens is positioned as the element closer to the eye and with its faceted surface away. Sharing the power between the two lens types and by allowing the singlet to be plano-convex with its flat surface in close proximity to the Fresnel Ions and its curved surface being aspheric results in an arrangement which is less bulky than that associated with the prior art aspheric singlet. Such an arrangement is illustrated in FIG. 7A.

FIG. 7A shows a lens arrangement 300 comprising a first or proximal Fresnel lens element 302 and a second or distal plano-convex aspheirc lens element 304. The first Fresnel lens element 302 includes a flat surface side 306 facing towards the eye 308 and an opposite faceted surface side 310 facing towards the display screen 312. The plano-convex aspheirc lens element 304 includes a flat surface side 314 interfacing with the faceted surface side 310 of the first Fresnel lens element 302 and an opposite curved surface 316 facing the display screen 312. The faceted surface side 310 of the first Fresnel lens element 302 defines wedge faces 318 and draft faces 320. FIG. 7A shows a bad ray 322 hitting a draft face 320 of the first Fresnel lens element 302, and a good ray 324 making it through both the first Fresnel lens element 302 and the second plano-convex aspheirc lens element 304, respectively. FIG. 7B shows the spot diagrams associated with the lens arrangement 300. FIG. 7C shows the drop off in illumination across the field of view for the lens arrangement 300.

The lens arrangement 300' of FIG. 8A is similar to the lens arrangement of FIG. 7A with the difference that lens arrangement 300' includes a including a diffractive surface. Including a diffractive surface can compensate for some of the chromatic aberration which results in color fringing getting progressively worse towards the edge of, the field of view. FIG. 8A shows a lens arrangement 300' comprising a first or proximal Fresnel lens element 302' and a second or distal plano-convex aspheirc lens element 304'. The first Fresnel lens element 302' includes a flat surface side 306' facing towards the eye 308 and an opposite faceted surface side 310' facing towards the display screen 312. The plano-convex aspheirc lens element 304' includes a flat surface side 314' Interfacing with the faceted surface side 310' of the first Fresnel lens element 302' and an opposite curved surface 316' facing the display screen 312. The faceted surface side 310' of the first Fresnel lens element 302' defines wedge faces 318' and draft faces 320'. FIG. 8A shows a bad ray 323 hitting a draft face 320' of the first Fresnel lens element 302', and a good ray 325 making it through both the first Fresnel lens element 302' and, the second plano-convex aspheirc lens element 304', respectively. FIG. 8B shows the spot diagrams associated with the lens arrangement 300'. FIG. 8C shows the drop off in illumination across the field of view for the lens arrangement 300'.

Embedding a diffractive surface within an optical element, because the refractive index step is much less, requires the facet steps to be substantially larger, resulting in the fabrication of said surface being less sensitive to manufacturing errors. Implementing an embedded diffractive surface does however mean a slight increase in the overall thickness of the ocular as illustrated in FIG. 9A.

FIG. 9A shows a lens arrangement 400 comprising a first or proximal Fresnel lens element 402 and a second or distal plano-convex aspheirc lens element. 404. The first Fresnel lens element 402 includes a flat surface side 406 facing towards the eye 408 and an opposite faceted surface side 410 facing towards the display screen 412. The plano-convex aspheirc lens element 404 includes a flat surface side 414 interfacing with the faceted surface side 410 of the first Fresnel lens element 402 and an opposite curved surface 416 facing the display screen 412. The faceted surface side 410 of the first Fresnel lens element 402 defines wedge faces 418 and draft faces 420. A binary surface element 422 is embedded to the flat surface side 414 of the plano-convex aspheirc lens element 404 and defines a flat surface thereof 424 in close proximity to the faceted surface side 410. FIG. 9A shows a bad ray 425 hitting a draft face 420 of the first Fresnel lens element 402, and a good ray 427 making it through both the first Fresnel lens element 402 and the second plano-convex aspheirc lens element 404, respectively. Performance plots as depicted in FIGS. 9B and 9C are similar to those given in FIGS. 8B and 8C.

In an embodiment, element 422 can be a third lens element comprising a binary surface facing towards the faceted surface side of the first Fresnel lens 402. In an embodiment, element 422 could also be a multilayer diffractive optical element, which technically does not point towards anything.

Throughput can be improved especially at the edge of the FOV by allowing the draft faces to be inclined appropriately. The draft angle of the draft faces are measured between the draft faces and the optical axis of the eyepiece, on a plane in which the optical axis lies. More specifically, the draft angles can be arranged in a way such that the rays forming the images are as parallel as possible to the draft faces. This typically yields draft angles close to 0° in the center of the lens, close to the optical axis. The draft angles typically fan out as the field angle augments towards the periphery of the lens.

FIG. 10A illustrates a Fresnel/singlet combination in which the draft faces have been shaped to optimize beam passage. FIG. 10A illustrates a lens arrangement 400' that is similar to lens arrangement 400 but with the draft faces having been appropriately inclined as understood by the skilled artisan. FIG. 10A shows a lens arrangement 400' comprising a first or proximal Fresnel lens element 402' and a second or distal plano-convex aspheirc lens element 404'. The first Fresnel lens element 402' includes a flat surface side 406' facing towards the eye 408 and an opposite faceted surface side 410' facing towards the display screen 412. The plano-convex aspheirc lens element 404' includes a flat surface side 414' Interfacing with the faceted surface side 410' of the first Fresnel lens element 402' and an opposite curved surface 416' facing the display screen 412. The faceted surface side 410' of the first Fresnel lens element 402' defines wedge faces 418' and draft faces 420'. A binary surface element 422' is embedded to the flat surface side 414' of the plano-convex aspheirc lens element 404' and defines a flat surface thereof 424' in close proximity to the faceted surface side 410'. FIG. 10A shows a bad ray 429 hitting a draft face 420' of the first Fresnel lens element 402', and a good ray 431 making it through both the first Fresnel lens element 402' and the second plano-convex aspheirc lens element 404', respectively. FIG. 10B shows the spot diagrams associated with the lens arrangement 400'. FIG. 10C shows the drop off in illumination across the field of view for the lens arrangement 400'. While spot diagrams remain the same, drop-off in illumination across the FOV has been much reduced. Ghosting caused by reflections off draft faces can be eliminated by applying a black absorbing coating to the draft faces, or transformed to a general contrast loss by giving the draft faces a rough finish.

One way to selectively give the draft faces of the Fresnel lens a rough finish is to mold them that way. The draft faces in the mold insert can be roughened by careful masking and sandblasting. A second way is to directionally deposit a protective layer of aluminum on wedge faces on the nickel mold insert via evaporation, then roughen the exposed nickel draft faces via sandblasting. The aluminum mask can be removed in the end by etching in a KOH solution. A third way is to etch or sandblast the surface of the mold insert to generate a diffuse finish on the entire surface and re-machine the wedge faces to restore their specular finish afterwards. The mold surface finish is transferred onto the Fresnel lens by injection molding, injection compression molding, compression molding or vacuum molding. Other masking materials, etchants and mold insert materials can be used as long as the etchant can selectively remove the masking material without affecting the mold insert.

A way to deposit a black absorbing coating on the draft faces of the Fresnel lens is to directionally deposit a protective layer of aluminum on the wedge faces of the Fresnel lens via evaporation, then deposit in a non-directional manner a light absorbing material like manganese ferrite ($MnFe_2O_4$) on the lens via sputtering. Finally, using a KOH solution, a lift-off process can be used to remove the aluminum and manganese ferrite layers off the wedge faces while leaving the manganese ferrite on the draft faces. Other masking materials, etchants and light absorbing materials can be used as long as the etchant can selectively remove the masking material without affecting the light absorbing material. Another way of achieving black absorbing drafts is to directionally deposit a protective layer of aluminum on the wedge faces of the Fresnel lens via evaporation, then soak the lens in a black dyeing solution, and finally remove the Al mask using a KOH solution. An even better way of achieving this coating is to deposit a protective layer of $SiO_2$ on the lens by glancing angle deposition. This creates a low refractive-Index porous layer on the draft faces, and a non-porous glass layer on the wedge faces. The lens can then be soaked in a black dyeing solution which penetrates the porous coating on the draft faces, but not the non-porous coating on the wedge faces. This low refractive-index coating has the advantage of acting as an anti-reflection coating, letting more light pass through the black dye, further diminishing stray light and ghost images. The rays incoming to the draft faces from the inside of the Fresnel lens are absorbed by the black dye and the rays incoming to the draft faces from the outside of the Fresnel lens have a higher probability of entering the Fresnel lens through the draft face due to the low-index GLAD coating, so they have a higher probability of being absorbed by the black dye.

As a second element, either a Fresnel lens, a singlet or a doublet can be used. Using a Fresnel lens as a second element has the advantage of further reducing the weight of the eyepiece, but has the downside of inducing more stray light and a diminished throughput. Moreover, the combination of two Fresnel lenses can induce a Moiré pattern that is objectionable to the viewer. Using a singlet lens as a second element allows to minimize the Fresnel artifacts while still allowing for a eyepiece having a weight substantially lower and a higher resolution than a design using a single singlet element. Using a doublet lens as a second element permits to correct some chromatic aberrations, but at the expense of augmenting the weight of the eyepiece considerably.

With respect to the above-described Figures, it is common practice among optical designers, when modeling optical arrangements, to locate the object and image spaces at the long and short conjugates respectively, so effectively reversing the system, tracing rays accordingly. This is the reason for the schematics illustrated herein. While this does not represent exactly the beam trajectories occurring in the actual application of the ocular lens, it does nevertheless clearly indicate the vignetting issues involved with these types (Fresnel) of systems as understood by the skilled artisan, Accordingly, and with reference to FIG. 11, unlike the schematic illustrations of FIGS. 1A to 10A which were provided for the reasons explained above, in a Head-mounted device (HMD) 500 worn by a user (in the field of virtual or augmented reality as is known in the art), a display screen 502 is mounted to the HMD 500 and in communication with a data image processor 504. An optical lens arrangement 506 is mounted to the HMD 500 and interposed between the eye 506 of a user and the display screen 502. As such, the trajectory of light beams 510 is from the display screen 502 through the optical lens arrangement 506 to the eye 508. The optical lens arrangement 506 is a non-limiting schematic general representation and is selected from an embodiment disclosed herein, such as and without limitation to lens arrangement 200, 200', 300, 300', 400, 400' as well as combinations thereof within the scope of the present description.

In an embodiment, the distance between the first Fresnel lens element and the second lens element is anywhere between about 0 mm to about 5 mm as can be appreciated by the skilled artisan.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. An optical lens arrangement for a head-mounted device comprising:
   a first Fresnel lens element defining a flat surface side and an opposite faceted surface side defining wedge faces and draft faces, the flat surface side facing towards an eye of a user while the head-mounted device is worn and the opposite faceted surface side facing away from the eye of the user while the head-mounted device is worn; and
   a second plano-convex lens element defining a flat surface side and an opposite convex curved surface side, the flat surface side facing towards the faceted side of the first Fresnel lens element, the opposite curved surface side facing away from the first Fresnel lens element.

2. The optical lens arrangement of claim 1, wherein the draft faces of the first Fresnel element comprise a black absorbing coating or dye.

3. The optical lens arrangement of claim 1, wherein the draft faces of the first Fresnel element comprise a rough diffusive finish.

4. The optical lens arrangement of claim 1, wherein the draft faces of the first Fresnel element comprise an anti-reflective coating.

5. The optical lens arrangement of claim 1, wherein the optical lens arrangement defines an optical axis, a draft angle being defined between the draft faces and the optical axis of the optical lens arrangement in a plane in which the optical axis lies, wherein the draft angles are arranged for providing for light rays passing through the optical lens arrangement to be almost substantially parallel to the draft faces for a specific pupil position.

6. The optical lens arrangement of claim 1, wherein the second plano-convex lens element comprises an aspheric lens.

7. The optical lens arrangement of claim 1, wherein the flat surface side of the Fresnel lens comprises a diffractive surface.

8. The optical lens arrangement of claim 7, wherein the diffractive surface comprises a binary surface.

9. The optical lens arrangement of claim 1, comprising a binary surface adjacent to the space between the first Fresnel lens element and the second plano-convex lens element.

10. The optical lens arrangement of claim 1, wherein the distance between the first Fresnel lens element and the second plano-convex lens element is from about 0 mm to about 5 mm.

11. A head-mounted device comprising:
    a data image processor;
    a display screen in communication with the data image processor for displaying video for a user; and
    an optical lens arrangement comprising:
       a first Fresnel lens element defining a flat surface side and an opposite faceted surface side defining wedge faces and draft faces, the flat surface side facing away from the display and the opposite faceted surface side facing towards the display; and
       a second plano-convex lens element disposed between the first Fresnel lens element and the display defining a flat surface side and an opposite convex curved surface side, the flat surface side facing towards the faceted side of the first Fresnel lens element, the opposite curved surface side facing away from the first Fresnel lens element.

12. The head-mounted device of claim 11, wherein the draft faces of the first Fresnel element comprise at least one of a black absorbing coating or dye, a rough diffusive finish, or an anti-reflective coating.

13. The head-mounted device of claim 11, wherein the optical lens arrangement defines an optical axis, a draft angle being defined between the draft faces and the optical axis of the optical lens arrangement in a plane in which the optical axis lies, wherein the draft angles are arranged for providing for light rays passing through the optical lens arrangement to be almost substantially parallel to the draft faces for a specific pupil position.

14. The head-mounted device of claim 11, wherein the second plano-convex lens element comprises an aspheric lens.

15. The head-mounted device of claim 11, wherein the flat surface side of the first Fresnel lens element comprises a diffractive surface.

16. The head-mounted device of claim 11, wherein the optical lens arrangement comprises a binary surface adjacent to the space between the first Fresnel lens element and the second plano-convex lens element.

17. The head-mounted device of claim 11, wherein the distance between the first Fresnel lens element and the second plano-convex lens element is from about 0 mm to about 5 mm.

18. A method of making a lens arrangement comprising:
    providing a first Fresnel lens element defining a flat surface side and an opposite faceted surface side defining wedge and draft faces, the flat surface side being positioned for facing towards the eye of a user and the opposite faceted surface side being positioned for facing away from the eye of the user; and
    positioning a second plano-convex lens element in front of the first Fresnel element defining a flat surface side and an opposite convex curved surface side, the flat surface side facing towards the faceted side of the first Fresnel lens element, the opposite curved surface side facing away from the first Fresnel lens element.

19. The method of claim 18, wherein the lens arrangement defines an optical axis, a draft angle being defined between the draft faces and the optical axis of the lens arrangement in a plane in which the optical axis lies, the method further comprising arranging the draft angles for providing for light rays passing through the optical lens arrangement to be almost substantially parallel to the draft faces.

20. The method of claim 18, wherein the second plan-convex lens element is positioned at a distance from about 0 mm to about 5 mm from the first Fresnel lens element.

* * * * *